United States Patent
Hannuksela

(10) Patent No.: US 11,095,907 B2
(45) Date of Patent: Aug. 17, 2021

(54) APPARATUS, A METHOD AND A COMPUTER PROGRAM FOR VIDEO CODING AND DECODING

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/498,160

(22) PCT Filed: Mar. 6, 2018

(86) PCT No.: PCT/FI2018/050162
§ 371 (c)(1),
(2) Date: Sep. 26, 2019

(87) PCT Pub. No.: WO2018/178507
PCT Pub. Date: Oct. 4, 2018

(65) Prior Publication Data
US 2020/0045323 A1    Feb. 6, 2020

(30) Foreign Application Priority Data
Mar. 27, 2017  (FI) .................................. 20175285

(51) Int. Cl.
*H04N 19/184*    (2014.01)
*H04N 19/30*     (2014.01)
(Continued)

(52) U.S. Cl.
CPC ......... *H04N 19/184* (2014.11); *H04L 65/608* (2013.01); *H04N 19/30* (2014.11); *H04N 19/51* (2014.11); *H04N 19/597* (2014.11)

(58) Field of Classification Search
CPC .... H04N 21/8543; H04N 19/30; H04N 19/51; H04N 21/23439; H04N 21/8456;
(Continued)

(56) References Cited

U.S. PATENT DOCUMENTS

2004/0114684 A1    6/2004  Karczewicz et al.
2005/0123056 A1    6/2005  Wang et al.
(Continued)

FOREIGN PATENT DOCUMENTS

WO    2008/129500 A2    10/2008
WO    2017/140946 A1    8/2017

OTHER PUBLICATIONS

"Advanced Video Coding for Generic Audiovisual Services", Series H: Audiovisual and Multimedia SystemsInfrastructure of audiovisual services—Coding of movingvideo, Recommendation ITU-T H.264, Oct. 2016, 804 pages.
(Continued)

*Primary Examiner* — Neil R Mikeska
(74) *Attorney, Agent, or Firm* — Harrington & Smith

(57) ABSTRACT

A method comprising: encoding an input picture sequence into a first bitstream (1000), said encoding comprising: encoding a first input picture into first two coded pictures of the first bitstream, wherein one of said two coded pictures is a first shared coded picture (1000a); encoding a first set of input pictures into a first set of coded pictures of the first bitstream, following in decoding order the first two coded pictures of the first bitstream, wherein any picture subsequent to the first shared coded picture in decoding order is not predicted from any picture that precedes the first shared coded picture in decoding order and is not a shared coded picture (1000b); and encoding the input picture sequence into a second bitstream (1002), said encoding comprising: encoding the first input picture into first two coded pictures of the second bitstream, wherein one of said two coded pictures is the first shared coded picture (1002a); encoding the first set of input pictures into a second set of coded pictures of the second bitstream, following in decoding order the first two coded pictures of the second bitstream and differing from the first set of coded pictures of the first
(Continued)

bitstream, wherein any picture subsequent to the first shared coded picture in decoding order is not predicted from any picture that precedes the first shared coded picture in decoding order and is not a shared coded picture (1002b).

22 Claims, 14 Drawing Sheets

(51) Int. Cl.
*H04N 19/51* (2014.01)
*H04N 19/597* (2014.01)
*H04L 29/06* (2006.01)

(58) Field of Classification Search
CPC .... H04N 19/597; H04N 19/184; H04N 19/17; H04L 65/608
See application file for complete search history.

(56) References Cited

U.S. PATENT DOCUMENTS

| | | | |
|---|---|---|---|
| 2007/0073779 A1 | 3/2007 | Walker et al. | |
| 2007/0291835 A1* | 12/2007 | Sung | H04N 19/164 375/240 |
| 2008/0267287 A1 | 10/2008 | Hannuksela | |
| 2012/0320966 A1* | 12/2012 | Guo | H04N 21/44008 375/240.02 |
| 2014/0184850 A1* | 7/2014 | Raju | H04N 5/2624 348/239 |
| 2014/0286393 A1 | 9/2014 | Kadono et al. | |
| 2015/0016529 A1* | 1/2015 | Wan | H04N 19/40 375/240.16 |
| 2015/0042878 A1* | 2/2015 | Jeon | H04N 19/59 348/441 |
| 2016/0044082 A1* | 2/2016 | Yoon | H04L 65/4076 709/219 |
| 2018/0183845 A1* | 6/2018 | Coward | H04L 65/602 |

OTHER PUBLICATIONS

"Information technology—Dynamic adaptive streaming over HTTP (DASH)", Part 1: Media presentation description and segment formats, ISO/IEC 23009-1, May 15, 2014, 152 pages.
Hannuksela, "DASH Property Descriptors for Generic Tile Collection Representations", ISO/IEC JTC1/SC29/WG11 MPEG2017/Mxxxxx, Apr. 2017, 8 pages.
Myers et al., "The Content-MD5 Header Field", RFC 1864, Network Working Group, Oct. 1995, pp. 1-4.
"Video Back-channel Messages for Conveyance of Status Information and Requests from a Video Receiver to a Video Sender", Series H: Audiovisual and Multimedia Systems Infrastructure of audiovisual services—Coding of moving video, ITU-T Recommendation H.271, May 2006, 22 pages.
"Information Technology—Generic Coding of Moving Pictures and Associated Audio Information: Systems", Series H: Audiovisual and Multimedia Systems Infrastructure of audiovisual services—Transmission multiplexing and synchronization, Recommendation ITU-T H.222.0, Mar. 2017, 291 pages.
""Information Technology—Coding of Audio-visual Objects", Part 12: ISO base media file format, ISO/IEC 14496-12, Dec. 15, 2015, 248 pages."
"Information Technology—Coding of Audio-visual Objects", Part 15: Advanced Video Coding (AVC) file format, ISO/IEC 14496-15, Apr. 15, 2004, 29 pages.
"Video Coding for Low Bit Rate Communication", Series H: Audiovisual and Multimedia SYSTEMSInfrastructure of audiovisual services—Coding of movingvideo, ITU-T Recommendation H.263, Jan. 2005, 226 pages.
"High Efficiency Video Coding", Series H: Audiovisual and Multimedia Systems Infrastructure of audiovisual services—Coding of moving video, Recommendation ITU-T H.265, Dec. 2016, 664 pages.
"Parameter Values for Ultra-high Definition Television Systems for Production and International Programme Exchange", Recommendation ITU-R BT.2020, Oct. 2015, 8 pages.
"Parameter Values for the HDTV Standards for Production and International Programme Exchange", Recommendation ITU-R BT.709-6, Jun. 2015, 19 pages.
"3rd Generation Partnership Project; Technical Specification Group Services and System Aspects; Transparent end-to-end Packet-switched Streaming Service (PSS); Protocols and codecs (Release 9)", 3GPP TS 26.234 V9.10.0, Jun. 2013, pp. 1-189.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 14)", 3GPP TS 26.247 V14.1.0, Mar. 2017, pp. 1-104.
Office action received for corresponding Finnish Patent Application No. 20175285, dated Nov. 20, 2017, 7 pages.
International Search Report and Written Opinion received for corresponding Patent Cooperation Treaty Application No. PCT/FI2018/050162, dated Jul. 6, 2018, 16 pages.
Chyi Su et al., "A Dynamic Video Streaming Scheme Based on SP/SI Frames of H.264/AVC", 41st International Conference on Parallel Processing Workshops, Sep. 10-13, 2012, pp. 524-529.
Lai et al., "Viewpoint Switching in Multiview Videos Using SP-Frames", 15th IEEE International Conference on Image Processing, Oct. 12-15, 2008, pp. 1776-1779.
Mavlankar et al., "Background Extraction and Long-term Memory Motion-compensated Prediction for Spatial-random-access-enabled Video Coding", Picture Coding Symposium, May 6-8, 2009, 4 pages.
Fuente et al., "Video Processing for Panoramic Streaming using HEVC and its Scalable Extensions", Multimedia Tools and Applications, vol. 76, No. 4, Feb. 2017, pp. 5631-5659.
Extended European Search Report received for corresponding European Patent Application No. 18776244.8, dated Jul. 20, 2020, 10 pages.
Karczewicz et al., "The SP- and SI-frames design for H.264/AVC", IEEE Transactions on Circuits and Systems for Video Technology, vol. 13, No. 7, Jul. 2003, pp. 637-644.

\* cited by examiner

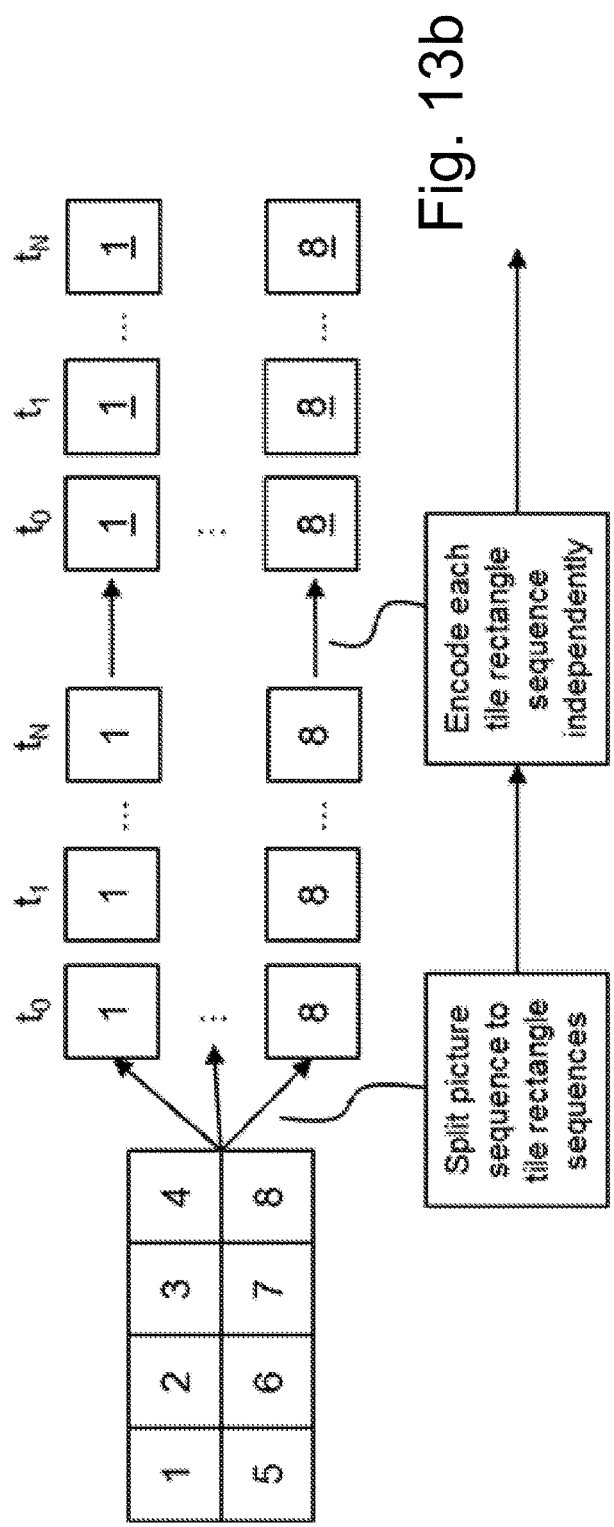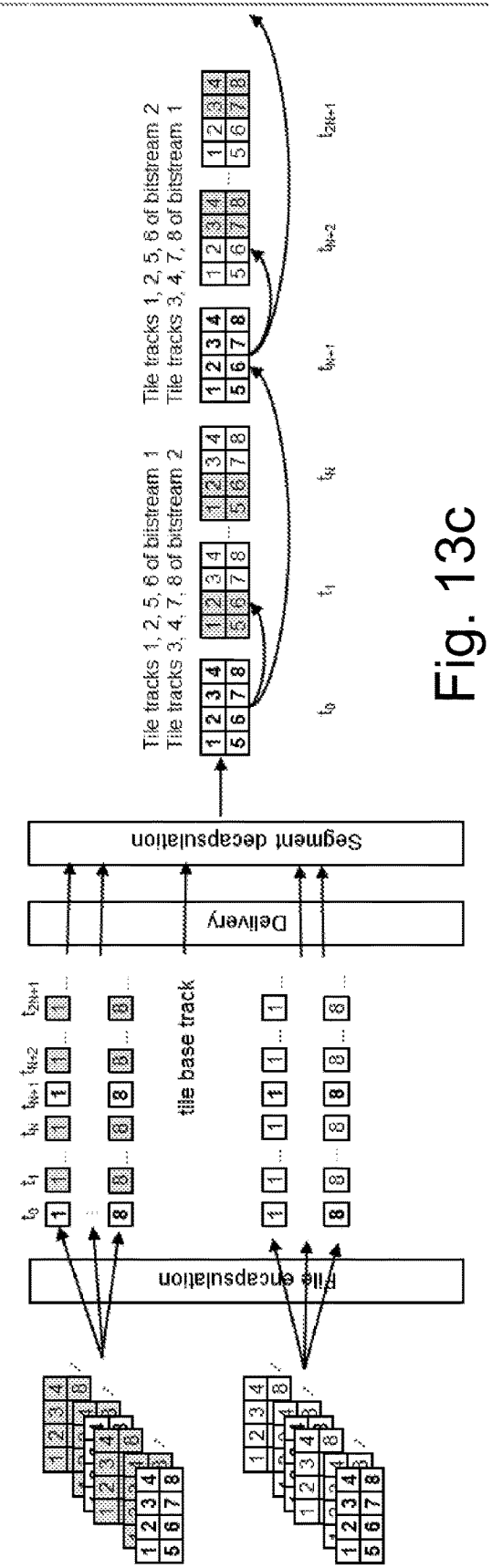

APPARATUS, A METHOD AND A COMPUTER PROGRAM FOR VIDEO CODING AND DECODING

RELATED APPLICATION

This application was originally filed as Patent Cooperation Treaty Application No. PCT/FI2018/050162 filed Mar. 6, 2018 which claims priority benefit to Finland National Patent Application No. 20175285, filed Mar. 27, 2017.

TECHNICAL FIELD

The present invention relates to an apparatus, a method and a computer program for video coding and decoding.

BACKGROUND

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. DASH has turned out to be a promising protocol for multimedia streaming applications, especially for 360-degree video or virtual reality (VR) video bitstreams.

In viewport-adaptive streaming, the bitrate is aimed to be reduced e.g. such that the primary viewport (i.e., the current viewing orientation) is transmitted at the best quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP).

There are several alternatives to deliver the viewport-dependent omnidirectional video. It can be delivered, for example, as equal-resolution High Efficiency Video Coding (HEVC) bitstreams with motion-constrained tile sets (MCTSs). Thus, several HEVC bitstreams of the same omnidirectional source content are encoded at the same resolution but different qualities and bitrates using motion-constrained tile sets. Another option to deliver the viewport-dependent omnidirectional video is to carry out HEVC Scalable Extension (SHVC) region-of interest scalability encoding. Therein, the base layer is coded conventionally. Additionally, region-of-interest (ROI) enhancement layers are encoded with SHVC Scalable Main profile.

It has turned out that the SHVC ROI approach outperforms MCTS-based viewport-dependent delivery in terms of bitrate reduction, and enabling inter-layer prediction provides a significant compression gain compared to using no inter-layer prediction. However, limited support of the available decoding hardware for inter-layer prediction, such as the SHVC extension of HEVC, restricts the usability of the SHVC ROI encoding.

SUMMARY

Now in order to at least alleviate the above problems, an enhanced encoding method is introduced herein.

A method according to a first aspect comprises encoding an input picture sequence into a first bitstream, said encoding comprising: encoding a first input picture into first two coded pictures of the first bitstream, wherein one of said two coded pictures is a first shared coded picture; encoding a first set of input pictures into a first set of coded pictures of the first bitstream, following in decoding order the first two coded pictures of the first bitstream, wherein any picture subsequent to the first shared coded picture in decoding order is not predicted from any picture that precedes the first shared coded picture in decoding order and is not a shared coded picture; and encoding the input picture sequence into a second bitstream, said encoding comprising: encoding the first input picture into first two coded pictures of the second bitstream, wherein one of said two coded pictures is the first shared coded picture; encoding the first set of input pictures into a second set of coded pictures of the second bitstream, following in decoding order the first two coded pictures of the second bitstream and differing from the first set of coded pictures of the first bitstream, wherein any picture subsequent to the first shared coded picture in decoding order is not predicted from any picture that precedes the first shared coded picture in decoding order and is not a shared coded picture.

According to an embodiment, the first shared coded picture uses as prediction only zero or more other shared coded pictures.

According to an embodiment, the method further comprises indicating that switching between the first and second bitstreams is allowed starting from the first shared coded picture, said indication residing in the first and/or second bitstream, in a first segment or sub-segment formed from the first bitstream, in a second segment or sub-segment formed from the second bitstream, and/or in a media presentation description.

According to an embodiment, said indicating that switching between the first and second bitstreams is allowed starting from the first shared coded picture comprises including a same identifier value for the first shared coded picture in or along both the first and second bitstream.

According to an embodiment, the method further comprises forming the first segment or sub-segment so that it starts, in decoding order, with the first shared coded picture; forming the second segment or sub-segment so that it starts, in decoding order, with the first shared coded picture; and indicating in the media presentation description that switching is between first and second bitstreams is allowed at the start of the first or second segment or sub-sequence.

According to an embodiment, the method further comprises indicating, in the media presentation description, that the first and second bitstreams are alternatives for extraction into a collection representation.

The second and the third aspects relate to an apparatus and a computer readable storage medium stored with code thereon, which are arranged to carry out the above method and one or more of the embodiments related thereto.

The fourth aspect relates to a method comprising: obtaining at least a first segment or sub-segment from first one of a first bitstream or a second bitstream; obtaining a next segment or sub-segment of another one of the first and second bitstreams comprising a switching point that is a first shared coded picture wherein the first shared coded picture is present in both the first and second bitstreams, the first shared coded picture is followed in decoding order by another picture representing the same input picture as the first shared coded picture, and any coded picture following the first shared coded picture in decoding order is not predicted from any picture that precedes the first shared coded picture in decoding order and is not a shared coded picture; and decoding the at least the first segment or sub-segment and the next segment or sub-segment as a concatenation.

According to an embodiment, said obtaining comprises requesting said segments or sub-segments from a server and receiving said segments or sub-segments.

According to an embodiment, the method further comprises parsing a first indication that switching between a first bitstream and a second bitstream is allowed, said first indication residing in the first and/or second bitstream, in a first segment or sub-segment formed from the first bitstream, in a second segment or sub-segment formed from the second bitstream, and/or in a media presentation description; determining to switch from the first one of the first and second bitstreams to the another one of the first and second bitstreams; and concluding on the basis of the first indication or a second indication the next segment or sub-segment of the another one of the first and second bitstreams that comprises a switching point.

According to an embodiment, said first indication comprises a same identifier value for the first shared coded picture in or along both the first and second bitstream.

According to an embodiment, the method further comprises decoding, from the media presentation description, that switching between first and second bitstreams is allowed at the start of the next segment or sub-sequence.

According to an embodiment, the method further comprises decoding, from the media presentation description, that the first and second bitstreams are alternatives for extraction into a collection representation; and requesting, receiving, resolving, and decoding the collection representation.

The fifth and the sixth aspects relate to an apparatus and a computer readable storage medium stored with code thereon, which are arranged to carry out the above method and one or more of the embodiments related thereto.

BRIEF DESCRIPTION OF THE DRAWINGS

For better understanding of the present invention, reference will now be made by way of example to the accompanying drawings in which:

FIGS. 13a, 13b and 13c show examples of using tile-based viewport delivery according to various embodiments of the invention;

DETAILED DESCRIPTION OF SOME EXAMPLE EMBODIMENTS

Figure 1:
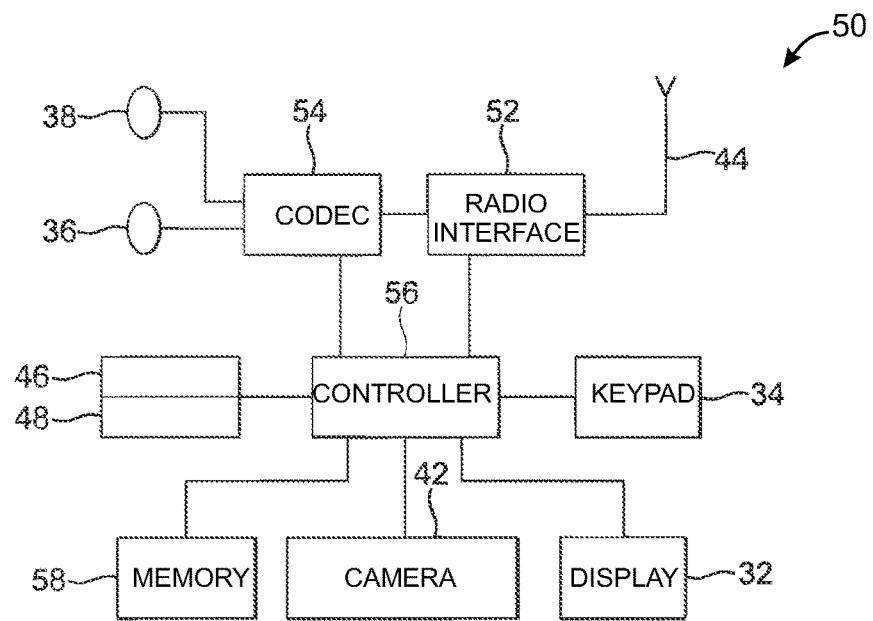
FIG. 1 shows schematically an electronic device employing embodiments of the invention.
Figure 2:
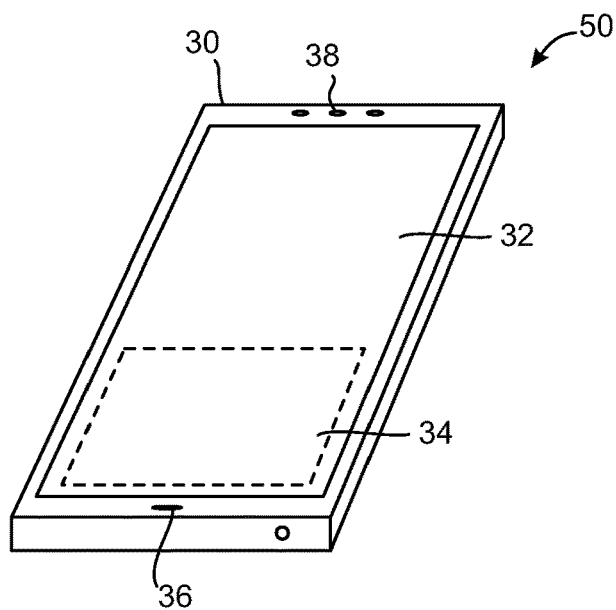
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
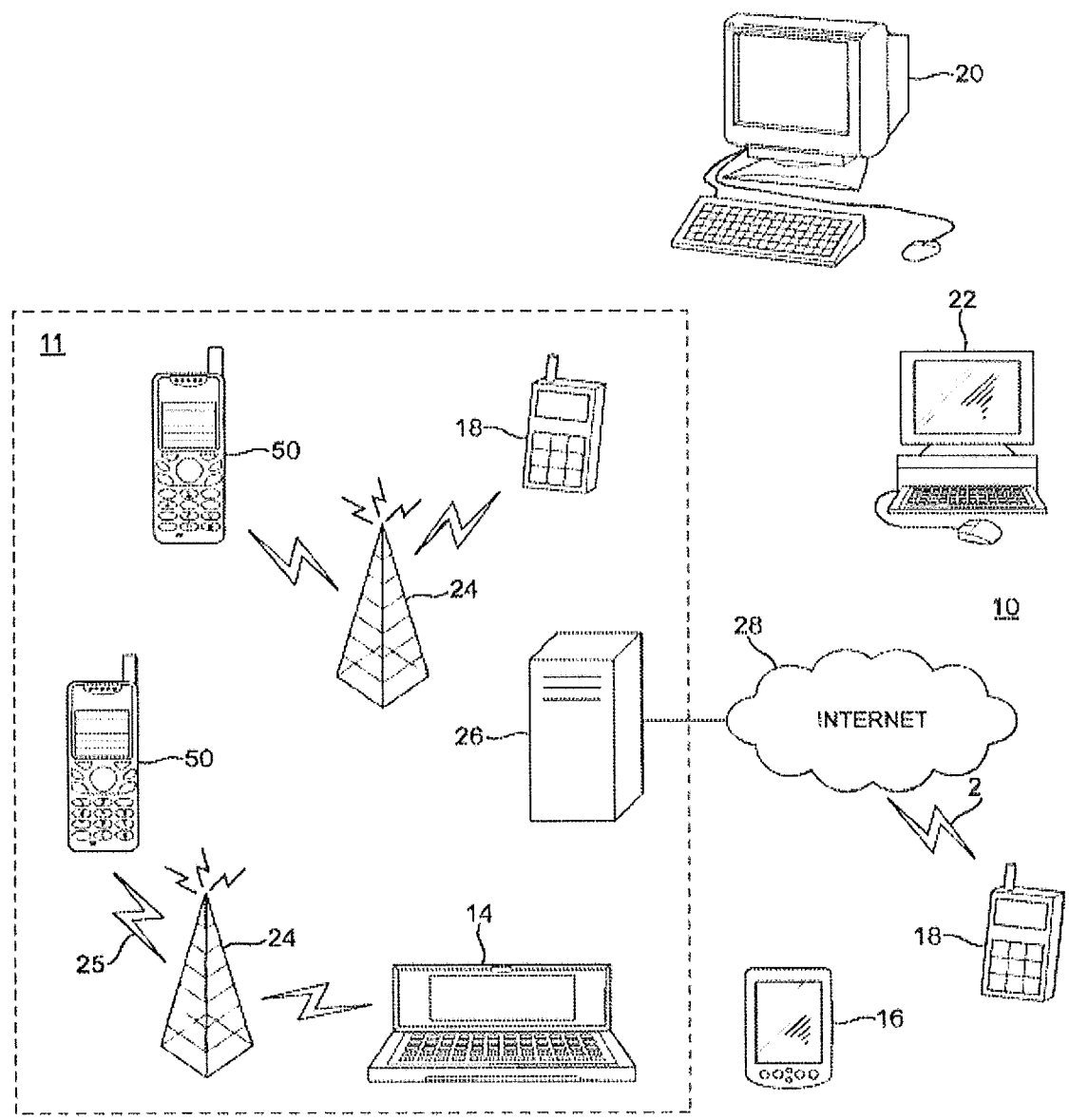
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

A hash function may be defined as is any function that can be used to map digital data of arbitrary size to digital data of fixed size, with slight differences in input data possibly producing big differences in output data. A cryptographic hash function may be defined as a hash function that is intended to be practically impossible to invert, i.e. to create the input data based on the hash value alone. Cryptographic hash function may comprise e.g. the MD5 function. An MD5 value may be a null-terminated string of UTF-8 characters containing a base64 encoded MD5 digest of the input data. One method of calculating the string is specified in IETF RFC 1864. It should be understood that instead of or in addition to MD5, other types of integrity check schemes could be used in various embodiments, such as different forms of the cyclic redundancy check (CRC), such as the CRC scheme used in ITU-T Recommendation H.271.

A checksum or hash sum may be defined as a small-size datum from an arbitrary block of digital data which may be used for the purpose of detecting errors which may have been introduced during its transmission or storage. The actual procedure which yields the checksum, given a data input may be called a checksum function or checksum algorithm. A checksum algorithm will usually output a significantly different value, even for small changes made to the input. This is especially true of cryptographic hash functions, which may be used to detect many data corruption errors and verify overall data integrity; if the computed checksum for the current data input matches the stored value of a previously computed checksum, there is a high probability the data has not been altered or corrupted.

The term checksum may be defined to be equivalent to a cryptographic hash value or alike.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
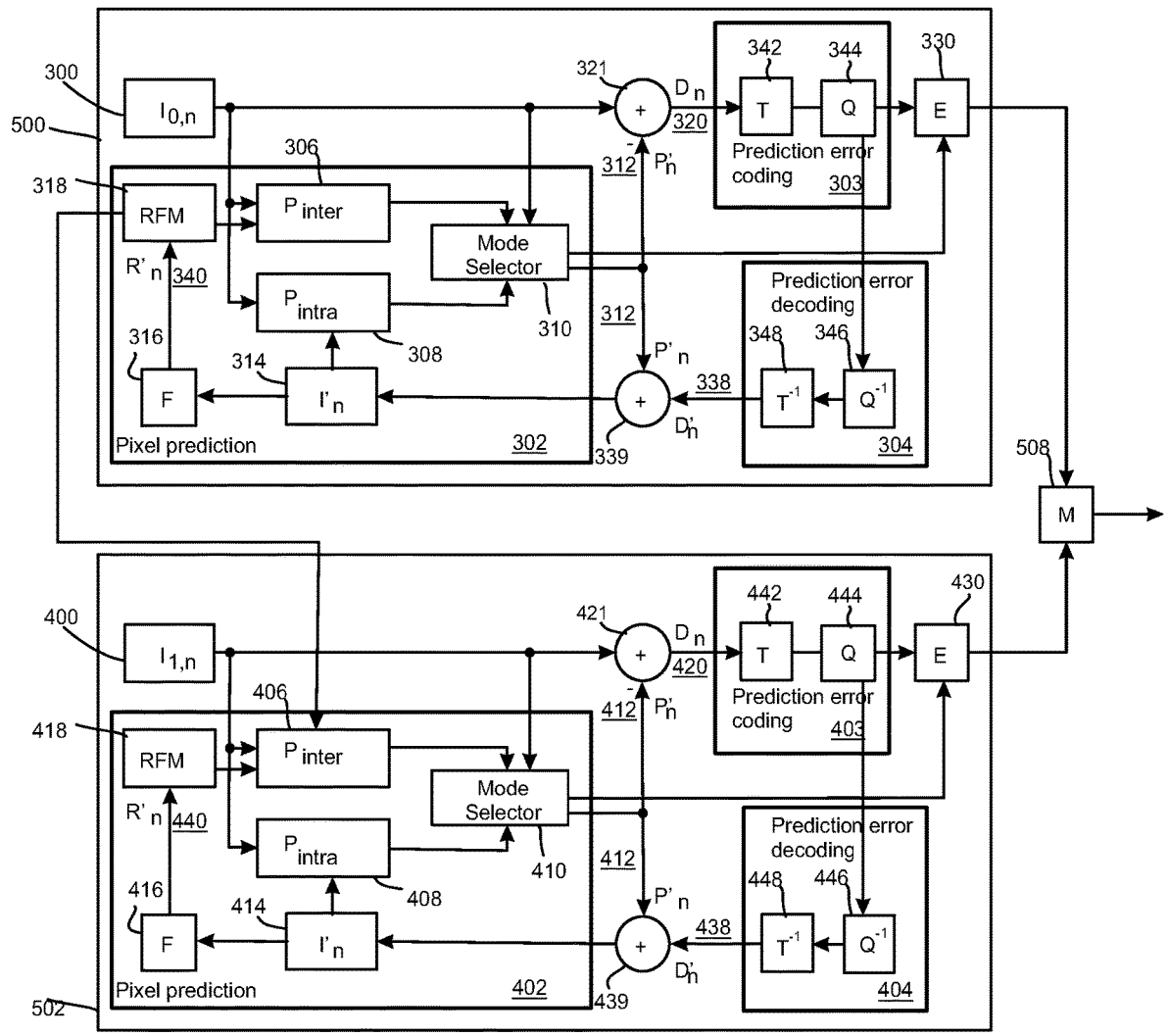
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:
- Luma (Y) only (monochrome).
- Luma and two chroma (YCbCr or YCgCo).
- Green, Blue and Red (GBR, also known as RGB).
- Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
- In monochrome sampling there is only one sample array, which may be nominally considered the luma array.
- In 4:2:0 sampling, each of the two chroma arrays has half the height and half the width of the luma array.
- In 4:2:2 sampling, each of the two chroma arrays has the same height and half the width of the luma array.
- In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

A motion-constrained tile set is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. It is noted that sample locations used in inter prediction are saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary. The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

Free-viewpoint navigation may refer to applications or services where an end-user has the ability to freely navigate around and through the scene which was acquired or captured by a set of cameras. The cameras may but need not form a systematical camera array, such as a parallel 1D camera array. Moreover, the cameras may but need not be located in a manner that suits content generation for stereoscopic or multiview autostereoscopic displays. For example, the cameras may form a sparse set of more than 10 cameras, arbitrarily arranged, with a wider baseline than typically used for stereoscopic video content generation for stereoscopic displays.

Specific end-user equipment may be used for the free-viewpoint navigation application or service. For example, Oculus Rift or similar virtual reality headset may be used. The headset may track head and/or eye movement and display a viewpoint accordingly. The headset may be capable of stereoscopic content viewing. However, free-viewpoint navigation may be realized with conventional end-user equipment too, such as desktop or laptop computers, tablets, or smartphones.

Figure 5:
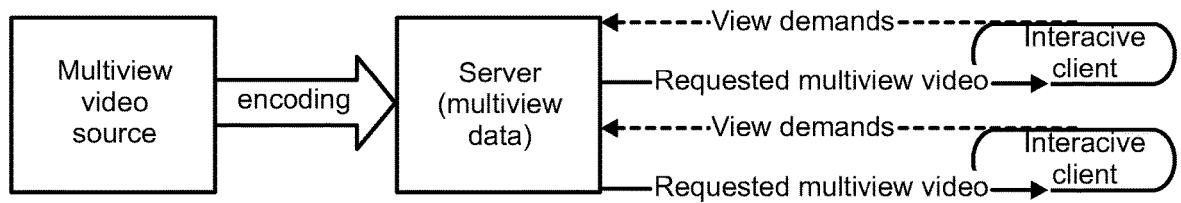
FIG. 5 shows an example of a system for free-viewpoint navigation.

FIG. 5 shows an example of a system for free-viewpoint streaming. Multiview video data are encoded, stored at a server, and provided for the consumption of client devices, which allow users to select interactively which view or views are rendered. Each client requests one or more views from the server depending on the rendering capabilities of its display. For example, one set of clients uses conventional 2D displays, a second set of clients is equipped with stereoscopic displays, while a third set of users can display more than two views at a time on a multiview autostereoscopic display. In order to save transmission bandwidth, the transmitted multiview bitstream is thinned in a manner that it just includes only the requested views and the views required for decoding the requested views. When a user changes viewpoints, the transmitted bitstream is adapted correspondingly.

Terms 360-degree video or virtual reality (VR) video may be used interchangeably. They may generally refer to video content that provides such a large field of view that only a part of the video is displayed at a single point of time in typical displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a typical flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

Figure 6A:
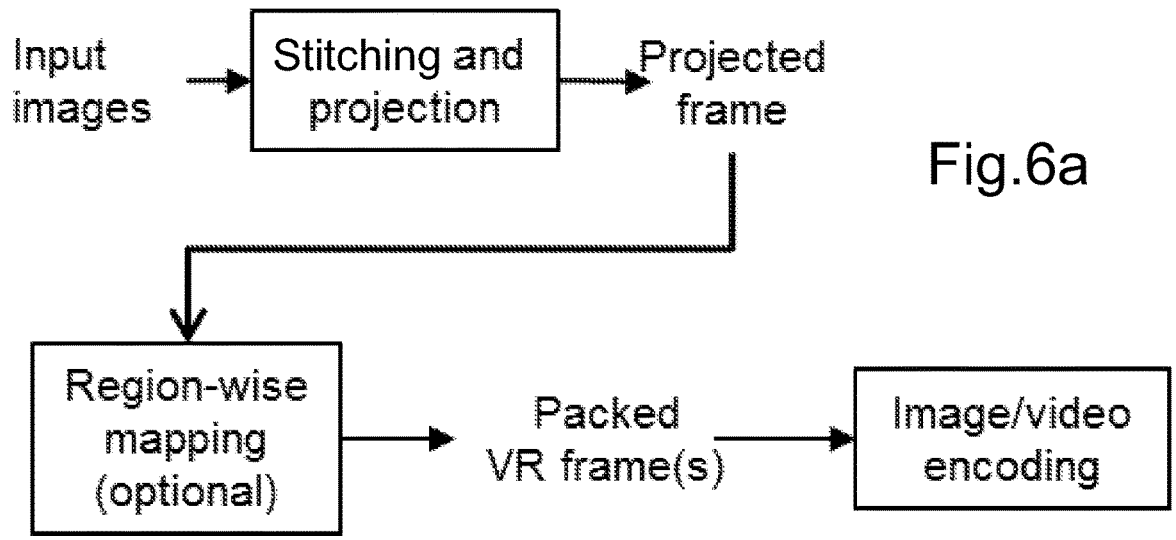
FIG. 6a shows an example of stitching, projecting and mapped images of the same time instance onto a packed virtual reality frame.

360-degree image or video content may be acquired and prepared for example as follows. Images or video can be captured by a set of cameras or a camera device with multiple lenses and sensors. The acquisition results in a set of digital image/video signals. The cameras/lenses typically cover all directions around the center point of the camera set or camera device. The images of the same time instance are stitched, projected, and mapped onto a packed VR frame. The breakdown of image stitching, projection, and mapping process is illustrated with FIG. 6a and described as follows. Input images are stitched and projected onto a three-dimensional projection structure, such as a sphere or a cube. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected frame can be formed. The image data on the projection structure is further arranged onto a two-dimensional projected frame. The term projection may be defined as a process by which a set of input images are projected onto a projected frame. There may be a pre-defined set of representation formats of the projected frame, including for example an equirectangular panorama and a cube map representation format.

Region-wise mapping may be applied to map projected frame onto one or more packed VR frames. In some cases, region-wise mapping may be understood to be equivalent to extracting two or more regions from the projected frame, optionally applying a geometric transformation (such as rotating, mirroring, and/or resampling) to the regions, and placing the transformed regions in spatially non-overlapping areas, a.k.a. constituent frame partitions, within the packed VR frame. If the region-wise mapping is not applied, the packed VR frame is identical to the projected frame. Otherwise, regions of the projected frame are mapped onto a packed VR frame by indicating the location, shape, and size of each region in the packed VR frame. The term mapping may be defined as a process by which a projected frame is mapped to a packed VR frame. The term packed VR frame may be defined as a frame that results from a mapping of a projected frame. In practice, the input images may be converted to a packed VR frame in one process without intermediate steps.

Figure 6B:
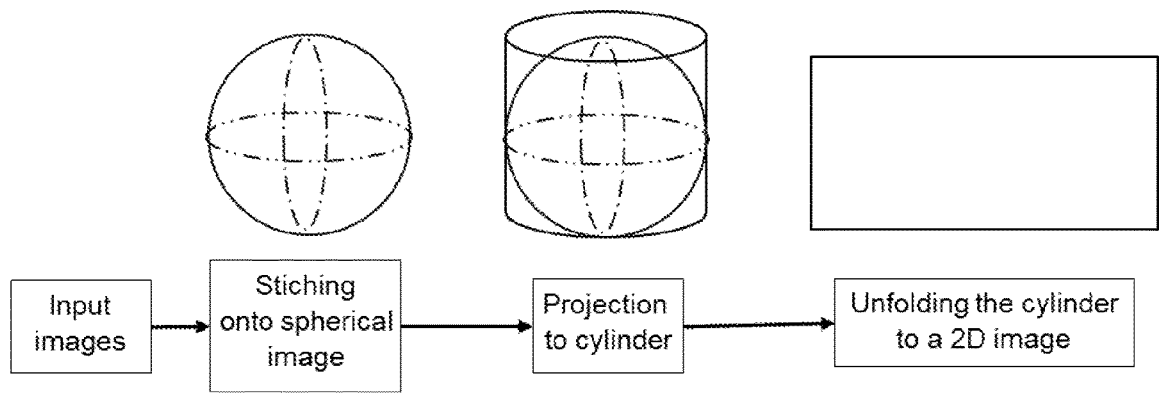
FIG. 6b shows a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that can be mapped to a bounding cylinder that can be cut vertically to form a 2D picture (this type of projection is known as equirectangular projection). The process of forming a monoscopic equirectangular panorama picture is illustrated in FIG. 6b. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected frame. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of panoramic projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of panoramic projection format.

The human eyes are not capable of viewing the whole 360 degrees space, but are limited to a maximum horizontal and vertical FoVs (HHFoV, HVFoV). Also, a HMD device has technical limitations that allow only viewing a subset of the whole 360 degrees space in horizontal and vertical directions (DHFoV, DVFoV)).

At any point of time, a video rendered by an application on a HMD renders a portion of the 360 degrees video. This portion is defined here as Viewport. A viewport is a window on the 360 world represented in the omnidirectional video displayed via a rendering display. A viewport is characterized by horizontal and vertical FoVs (VHFoV, VVFoV). In the following, VHFoV and VVFoV will be simply abbreviated with HFoV and VFoV.

A viewport size may correspond to the HMD FoV or may have a smaller size, depending on the application. For the sake of clarity, we define as primary viewport the part of the 360 degrees space viewed by a user at any given point of time.

When a multi-layer bitstream, such as a layered HEVC bitstream, is stored in a file, such as an ISOBMFF file, it may be allowed to store of one or more layers into a track. For example, when a content provider wants to provide a multi-layer bitstream that is not intended for subsetting, or when the bitstream has been created for a few pre-defined sets of output layers where each layer corresponds to a view (such as 1, 2, 5, or 9 views), tracks can be created accordingly.

When a bitstream with multiple sub-layers (a.k.a. multi-sub-layer bitstream), such as an HEVC bitstream with multiple sub-layers, is stored in a file, such as an ISOBMFF file, it may be allowed to store of one or more sub-layers into a track and more than one track may be used to contain the bitstream. For example, a track may contain only certain sub-layers and need not contain the lowest sub-layer (e.g. the sub-layer with TemporalId equal to 0 in HEVC).

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. An extractor track may be defined as a track that contains one or more extractors.

A tile track specified in ISO/IEC 14496-15 enables storage of one or more temporal motion-constrained tile set as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the tile-aligned samples of the tracks indicated by the 'sabt' track reference in the order of the track references.

A full-picture-compliant tile set {track|bitstream} is a tile set {track|bitstream} that conforms to the full-picture {track|bitstream} format. Here, the notation {optionA|optionB} illustrates alternatives, i.e. either optionA or optionB, which is selected consistently in all selections. A full-picture-compliant tile set track can be played as with any full-picture track using the parsing and decoding process of full-picture tracks. A full-picture-compliant bitstream can be decoded as with any full-picture bitstream using the decoding process of full-picture bitstreams. A full-picture track is a track representing an original bitstream (including all its tiles). A tile set bitstream is a bitstream that contains a tile set of an original bitstream but not representing the entire original bitstream. A tile set track is a track representing a tile set of an original bitstream but not representing the entire original bitstream.

A full-picture-compliant tile set track may comprise extractors as defined for HEVC. An extractor may for example an in-line constructor including a slice segment header and a sample constructor extracting coded video data for a tile set from a referenced full-picture track.

A sub-picture may be defined as a region, such as a tile or a tile rectangle, of a picture. A sub-picture track may be defined as a track that represents a sub-picture sequence, i.e. a region of a picture sequence and conforms to the a conventional track format, such as 'hvc1' or 'hev1' defined for HEVC in ISO/IEC 14496-15. In an approach to generate sub-picture tracks, a source picture sequence is split into sub-picture sequences before encoding. A sub-picture sequence is then encoded independently from other sub-picture sequences as a single-layer bitstream, such as HEVC Main profile bitstream. The coded single-layer bitstream is encapsulated into a sub-picture track. The bitstream for a sub-picture track may be encoded with motion-constrained pictures, as defined later. In another approach to generate sub-picture tracks, a source picture sequence is encoded with motion-constrained tile sets into a bitstream, a full-picture-compliant tile set bitstream is generated from the bitstream, and a sub-picture track is generated by encapsulating the full-picture-compliant tile set bitstream into a track. Sub-picture tracks generated this way comprise motion-constrained pictures.

A collector track may be defined as a track that extracts implicitly or explicitly MCTSs or sub-pictures from other tracks. A collector track may be a full-picture-compliant track. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. A tile base track may be regarded as a collector track, and an extractor track that extracts MCTSs or sub-pictures from other tracks may be regarded as a collector track. A collector track may also be referred to as a collection track. A track that is a source for extracting to a a collector track may be referred to as a collection item track.

Inter-view prediction can provide a significant compression gain for stereoscopic and multiview video coding but is conventionally supported only in some profiles of video coding standards, such as the Multiview Main profile of HEVC. In constrained inter-view prediction, the encoding of stereoscopic or multiview video is constrained in a manner that the coded content can be rewritten so that one or more single-layer and single-view decoders can be used, such as HEVC Main profile decoder(s). Only a limited subset of pictures, such as IRAP pictures of HEVC, of an independent view may be selected to be used as reference pictures in encoding a predicted view. A single-layer and single-view bitstream may be generated for the predicted view by including the limited subset of pictures of the independent view into the bitstream of the predicted view. Rewriting of high-level syntax structures, such as parameter sets and slice headers, may be required when generating the single-layer and single-view bitstream of the predicted view. Full-picture-compliant tracks may be generated to guide in the rewriting, and may comprise extractors to include coded picture data of the limited subset of the independent view and may comprise in-line constuctors for rewriting high-level syntax structures. The rewriting of the predicted view bitstream can be performed by resolving the full-picture-compliant tracks, i.e. by resolving extractors and in-line constructors therein.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

In many video communication or transmission systems, transport mechanisms, and multimedia container file formats, there are mechanisms to transmit or store a scalability layer separately from another scalability layer of the same bitstream, e.g. to transmit or store the base layer separately from the enhancement layer(s). It may be considered that layers are stored in or transmitted through separate logical channels. For example in ISOBMFF, the base layer can be stored as a track and each enhancement layer can be stored in another track, which may be linked to the base-layer track using so-called track references.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, $2^{nd}$ Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 7:
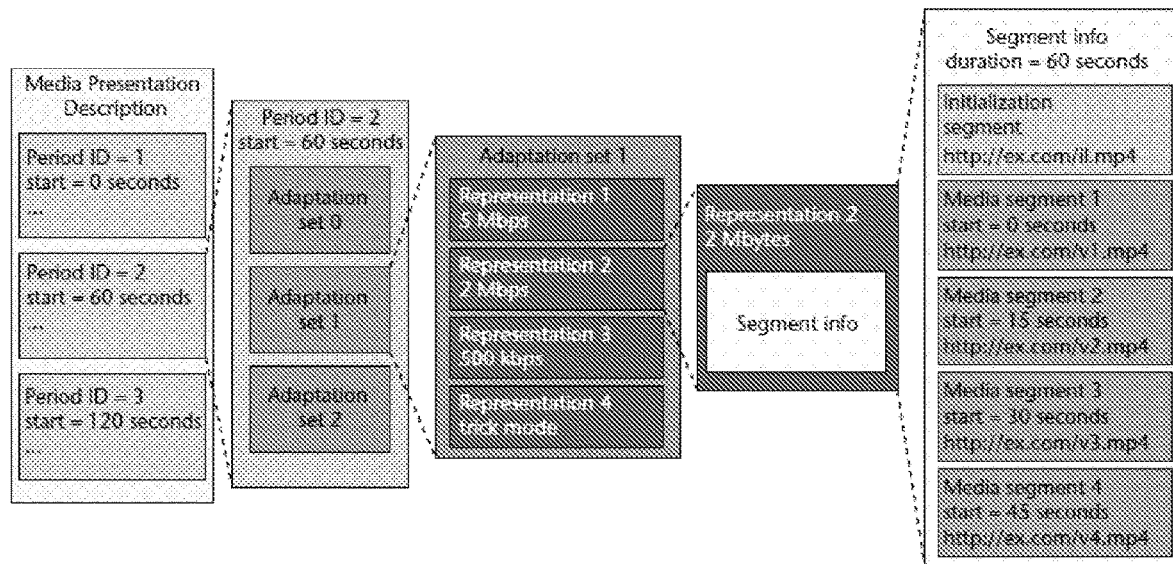
FIG. 7 shows an example of a hierarchical data model used in DASH.

In DASH, hierarchical data model is used to structure media presentation as shown in FIG. 7. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

Segments (or respectively Subsegments) may be defined to be non-overlapping as follows: Let $T_E(S,i)$ be the earliest presentation time of any access unit in stream i of a Segment or Subsegment S, and let $T_L(S,i)$ be the latest presentation time of any access unit in stream i of a Segment or Subsegment S. Two segments (respectively Subsegments), A and B, which may or may not be of different Representations, may be defined to be non-overlapping, when $T_L(A,i)<T_E(B,i)$ for all media streams i in A and B or if $T_L(B,i)<T_E(A,i)$ for all streams i in A and B where i refers to the same media component.

MPEG-DASH defines segment-container formats for both ISO Base Media File Format and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

DASH specifies different timelines including Media Presentation timeline and Segment availability times. The former indicates the presentation time of access unit with a media content which is mapped to the global common presentation timeline. Media Presentation timeline enables DASH to seamlessly synchronize different media components which is encoded with different coding techniques and shares a common timeline. The latter indicates a wall-clock time and is used to signal clients the availability time of Segments which is identified by HTTP URLs. A DASH client is able to identify an availability time of a certain Segment by comparing the wall-clock time to the Segment availability time assigned to that Segment. Segment availability time plays a key role in live delivery of media Segments, referred as live service. For live service, the Segment availability time is different from Segment to Segment and a certain Segment's availability time depends on the position of the Segment in the Media Presentation timeline. For on-demand service, the Segment availability time is typically the same for all Segments.

DASH supports rate adaptation by dynamically requesting Media Segments from different Representations within an Adaptation Set to match varying network bandwidth. Switching between Representations of different bitrates may be used for example to match the transmitted bitrate to the expected network throughput and/or to avoid congestion in the network. When a DASH client switches up/down Representation, coding dependencies within Representation have to be taken into account. Conventionally, a Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

Stream access points (which may also or alternatively be referred to as layer access point) for layered coding may be defined similarly in a layer-wise manner. A SAP for layer may be defined as a position in a layer (or alike) that enables playback of the layer to be started using only the information from that position onwards assuming that the reference layers of the layer have already been decoded earlier.

Stream access points (which may also or alternatively be referred to as sub-layer access point) for sub-layers may be defined in a sub-layer-wise manner. A SAP for sub-layer may be defined as a position that enables playback of the sub-layer to be started using only the information from that position onwards assuming that the lower sub-layers have already been decoded earlier.

A content provider may create Segment and Subsegment of multiple Representations in a way that makes switching simpler. In a simple case, each Segment and Subsegment starts with a SAP and the boundaries of Segment and Subsegment are aligned across the Representation of an Adaptation Set. In such a case a DASH client is able to switch Representations without error drift by requesting Segments or Subsegments from an original Representation to a new Representation. In DASH, restrictions to construct Segment and Subsegment are specified in MPD and Segment Index in order to facilitate a DASH client to switch Representations without introducing an error drift. One of the usages of profile specified in DASH is to provide different levels of restrictions to construct Segments and Subsegments.

The draft MPEG-DASH specification includes that feature of Segment Independent SAP Signaling (SISSI), which enables signaling of Segments starting with SAP having uneven durations. The draft MPEG-DASH specification defines SISSI signaling for switching within an Adaptation Set and across Adaptation Sets.

In switching within an Adaptation Set, the switching refers to the presentation of decoded data from one Representation up to a certain time t, and presentation of decoded data of another Representation from time t onwards. If Representations are included in one Adaptation Set, and the client switches properly, the Media Presentation is expected to be perceived seamless across the switch. Clients may ignore Representations that rely on codecs or other rendering technologies they do not support or that are otherwise unsuitable.

The Switching element as defined in Table 1 provides instructions of switch points within an Adaptation Set and the permitted switching options as defined in Table 2. This element may be used instead of the attributes @segmentAlignment or @bitstreamSwitching.

TABLE 1

Switch Point Signalling

| Element or Attribute Name | Use | Description |
|---|---|---|
| Switching | | Switching logic description for the associated Representation |

TABLE 1-continued

Switch Point Signalling

| Element or Attribute Name | Use | Description |
|---|---|---|
| @interval | M | specifies the interval between two switching points in the scale of the @timescale on Representation level. Any Segment for which the earliest presentation time minus the @t value of the S element describing the segment is an integer multiple of the product of @timescale and @interval is a switch-to opportunity, i.e. it enables to switch to this Representation with the switching strategy as defined by the @type value. The value may be such that it is aligned with the values in the Segment Timeline, i.e. a multiple of the value of the @d attribute. |
| @type | OD default: 'media' | specifies the switching strategy for the switch points identified in by the @interval attribute. Switching strategies are defined in Table 2. |

Table 2 defines different switching strategies that provide instructions to the client on the procedures to switch appropriately within an Adaptation Set.

TABLE 2

Switching Strategies

| Type | Description |
|---|---|
| media | Media level switching: In this case switching is possible at the switch point by decoding and presenting switch-from Representation up to switch point t, initializing the switch-to Representation with the associated Initialization Segment and continue decoding and presenting the switch-to Representation from time t onwards. |
| bitstream | Bitstream switching: In this case switching is possible at the switch point by decoding and presenting switch-from Representation up to switch point t, and continue decoding and presenting the switch-to Representation from time t onwards. Initialization of the switch-to Representation is not necessary and is not recommended. |

Random Access may refer to start processing, decoding and presenting the Representation from the random access point at time t onwards by initializing the Representation with the Initialization Segment, if present and decoding and presenting the Representation from the signaled Segment onwards, i.e. from the earliest presentation time of the signaled Segment. Random Access point may be signaled with the RandomAccess element as defined in Table 3.

TABLE 3

Random Access Point Signalling

| Element or Attribute Name | Use | Description |
|---|---|---|
| RandomAccess | | Random Access Information |
| @interval | M | specifies the position of the random access points in the Representations. The information is specified in the scale of the @timescale on Representation level. Any Segment for which the earliest presentation time minus the @t value of the S element describing the segment is an integer multiple of the product of @timescale and @interval is a random access opportunity, i.e. it enables randomly access to this Representation with the random access strategy as defined by the @type value. The value should be such that it is aligned with the values in the Segment Timeline, i.e. a multiple of the value of the @d attribute. |
| @type | OD default: "closed" | specifies the random access strategy for the random access points in by the @interval attribute. The value uses a type present in Table 4. If the value of the type is unknown, the DASH client is expected to ignore the containing Random Access element. |
| @minBufferTime | O | specifies a common duration used in the definition of the Representation data rate (using the @bandwidth attribute). If not present, then the value of the MPD level is inherited. |
| @bandwidth | O | Consider a hypothetical constant bitrate channel of bandwidth with the value of this attribute in bits per second (bps). Then, if the Representation is continuously delivered at this bitrate, starting at any RAP indicated in this element a client can be assured of having enough data for continuous playout providing playout begins after @minBufferTime * @bandwidth bits have been received (i.e. at time @minBufferTime after the first bit is received). For dependent Representations this value specifies the bandwidth according to the above definition for the aggregation of this Representation and all complementary Representations. If not present, the value of the Representation is inherited. |

TABLE 4

Random Access Type Values

| Type | Informative description |
|---|---|
| closed | Closed GOP random access. This implies that the segment is a Random Access Segment as well as the segment starts with a SAP type of 1 or 2. Note that SAP type 1 or 2 is a necessary condition, but not sufficient. In addition, all requirements of a Random Access Segment need to be fulfilled. |
| open | Open GOP random access. This implies that the segment is a Random Access Segment as well as the segment starts with a SAP type of 1, 2 or 3. Note that SAP type 1, 2 or 3 is a necessary condition, but not sufficient. In addition, all requirements of a Random Access Segment need to be fulfilled. |
| gradual | Gradual decoder refresh random. This implies that the segment is a Random Access Segment as well as the segment starts with a SAP type of 1, 2, 3 or 4. Note that SAP type 1 2, 3 or 4 is a necessary condition, but not sufficient. In addition, all requirements of a Random Access Segment need to be fulfilled. |

The DASH standard includes mechanisms to enable fast start-up of a media session. For example, the MPD may announce more than one representation, with different bitrates, in an Adaptation Set. Moreover, each segment and/or subsegment could start with a stream access point, where the pictures within the segment and/or subsegment are coded without referencing to any other picture from a different segment. This way a DASH client may start with a lower bitrate representation in order to increase the buffer occupancy level quickly. Then the client may then switch to requesting segment(s) and/or subsegment(s) of a higher bit rate representation (which may have e.g. a higher spatial resolution than the representation received earlier). The client may target to reach a certain buffer occupancy level, e.g. in terms of media duration, during the fast start-up and may target to keep the same or similar buffer occupancy level during the operation after a fast start-up phase. The client may start media playback after initiating a media streaming session and/or after a random access operation only after a certain amount of media has been buffered. This amount of media may be equal to but need not relate to the buffer occupancy level that is targeted to be reached at fast start-up. In all cases, the fast start-up may enable the client to start the media playback faster than would be possible if only a higher bitrate representation would be consistently received after initiating a media streaming session and/or after a random access operation.

As described above, the client or player may request Segments or Subsegments to be transmitted from different representations similarly to how the transmitted layers and/or sub-layers of a scalable video bitstream may be determined. Terms representation down-switching or bitstream down-switching may refer to requesting or transmitting a lower bitrate representation than what was requested or transmitted (respectively) previously. Terms representation up-switching or bitstream up-switching may refer to requesting or transmitting a higher bitrate representation than what was requested or transmitted (respectively) previously. Terms representation switching or bitstream switching may refer collectively to representation or bitstream up- and down-switching and may also or alternatively cover switching of representations or bitstreams of different viewpoints.

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

Streaming systems similar to MPEG-DASH include for example HTTP Live Streaming (a.k.a. HLS), specified in the IETF Internet Draft draft-pantos-http-live-streaming-13 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName=AttributeValue. Hence, tags of HLS M3U8 files may be considered similar to Elements in MPD or XML, and attributes of HLS M3U8 files may be considered similar to Attributes in MPD or XML. Media segments in HLS may be formatted according to the MPEG-2 Transport Stream and contain a single MPEG-2 Program. Each media segment is recommended to start with a Program Association Table (PAT) and a Program Map Table (PMT). Media segments in later versions of HLS may be compliant with ISOBMFF.

An encapsulated bitstream may be defined as a media bitstream, such as a video bitstream (e.g. an HEVC bitstream), that is stored in a container file or (Sub)segment(s) and may be considered to comprise the file format metadata, such as boxes of ISOBMFF.

As explained above, DASH and other similar streaming systems provide a protocol and/or formats for multimedia streaming applications, especially for multiview coded video bistreams. A recent trend in streaming in order to reduce the streaming bitrate of VR video is the following: a subset of 360-degree video content covering the primary viewport (i.e., the current view orientation) is transmitted at the best quality/resolution, while the remaining of 360-degree video is transmitted at a lower quality/resolution. There are generally two approaches for viewport-adaptive streaming:

1. Viewport-Specific Encoding and Streaming, a.k.a. Viewport-Dependent Encoding and Streaming, a.k.a. Asymmetric Projection, a.k.a. Packed VR Video.

In this approach, 360-degree image content is packed into the same frame with an emphasis (e.g. greater spatial area) on the primary viewport. The packed VR frames are encoded into a single bitstream.

Figure 8:
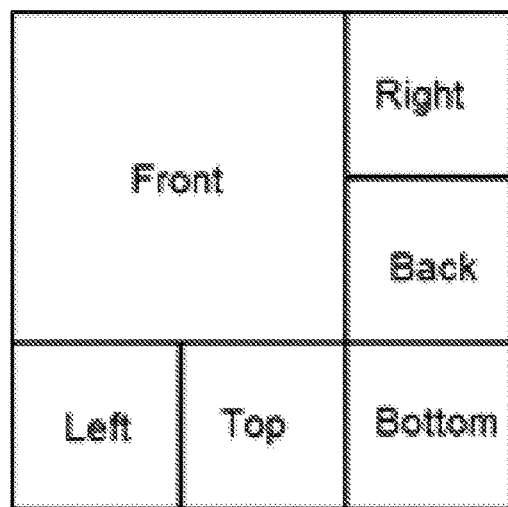
FIG. 8 shows an example of mapping a higher resolution sampled front face of a cube map on the same packed virtual reality frame as other cube faces.

For example, the front face of a cube map may be sampled with a higher resolution compared to other cube faces and the cube faces may be mapped to the same packed VR frame as shown in FIG. 8, where the front cube face is sampled with twice the resolution compared to the other cube faces.

2. VR Viewport Video, a.k.a. Tile-Based Encoding and Streaming

In this approach, 360-degree content is encoded and made available in a manner that enables selective streaming of viewports from different encodings.

An approach of tile-based encoding and streaming, which may be referred to as tile rectangle based encoding and streaming or sub-picture based encoding and streaming, may be used with any video codec, even if tiles similar to HEVC were not available in the codec or even if motion-constrained tile sets or alike were not implemented in an encoder. In tile rectangle based encoding, the source content is split into tile rectangle sequences (a.k.a. sub-picture sequences) before encoding. Each tile rectangle sequence covers a subset of the spatial area of the source content, such as full panorama content, which may e.g. be of equirectangular projection format. Each tile rectangle sequence is then encoded independently from each other as a single-layer bitstream. Several bitstreams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In an example of tile rectangle based encoding and streaming, each cube face may be separately encoded and encapsulated in its own track (and Representation). More than one encoded bitstream for each cube face may be provided, e.g. each with different spatial resolution. Players can choose tracks (or Representations) to be decoded and played based on the current viewing orientation. High-resolution tracks (or Representations) may be selected for the cube faces used for rendering for the present viewing orientation, while the remaining cube faces may be obtained from their low-resolution tracks (or Representations).

In an approach of tile-based encoding and streaming, encoding is performed in a manner that the resulting bitstream comprises motion-constrained tile sets. Several bitstreams of the same source content are encoded using motion-constrained tile sets.

In an approach, one or more motion-constrained tile set sequences are extracted from a bitstream, and each extracted motion-constrained tile set sequence is stored as a tile set track (e.g. an HEVC tile track or a full-picture-compliant tile set track) in a file. A tile base track (e.g. an HEVC tile base track or a full picture track comprising extractors to extract data from the tile set tracks) may be generated and stored in a file. The tile base track represents the bitstream by implicitly collecting motion-constrained tile sets from the tile set tracks or by explicitly extracting (e.g. by HEVC extractors) motion-constrained tile sets from the tile set tracks. Tile set tracks and the tile base track of each bitstream may be encapsulated in an own file, and the same track identifiers may be used in all files. At the receiver side the tile set tracks to be streamed may be selected based on the viewing orientation. The client may receive tile set tracks covering the entire omnidirectional content. Better quality or higher resolution tile set tracks may be received for the current viewport compared to the quality or resolution covering the remaining, currently non-visible viewports.

In an example, equirectangular panorama content is encoded using motion-constrained tile sets. More than one encoded bitstream may be provided, e.g. with different spatial resolution and/or picture quality. Each motion-constrained tile set is made available in its own track (and Representation). Players can choose tracks (or Representations) to be decoded and played based on the current viewing orientation. High-resolution or high-quality tracks (or Representations) may be selected for tile sets covering the present primary viewport, while the remaining area of the 360-degree content may be obtained from low-resolution or low-quality tracks (or Representations).

In an approach, each received tile set track is decoded with a separate decoder or decoder instance.

In another approach, a tile base track is utilized in decoding as follows. If all the received tile tracks originate from bitstreams of the same resolution (or more generally if the tile base tracks of the bitstreams are identical or equivalent, or if the initialization segments or other initialization data, such as parameter sets, of all the bitstreams is the same), a tile base track may be received and used to construct a bitstream. The constructed bitstream may be decoded with a single decoder.

In yet another approach, a first set of tile rectangle tracks and/or tile set tracks may be merged into a first full-picture-compliant bitstream, and a second set of tile rectangle tracks and/or tile set tracks may be merged into a second full-picture-compliant bitstream. The first full-picture-compliant bitstream may be decoded with a first decoder or decoder instance, and the second full-picture-compliant bitstream may be decoded with a second decoder or decoder instance. In general, this approach is not limited to two sets of tile rectangle tracks and/or tile set tracks, two full-picture-compliant bitstreams, or two decoders or decoder instances, but applies to any number of them. With this approach, the client can control the number of parallel decoders or decoder instances. Moreover, clients that are not capable of decoding tile tracks (e.g. HEVC tile tracks) but only full-picture-compliant bitstreams can perform the merging in a manner that full-picture-compliant bitstreams are obtained. The merging may be solely performed in the client or full-picture-compliant tile set tracks may be generated to assist in the merging performed by the client.

It is also possible to combine the approaches 1. (viewport-specific encoding and streaming) and 2. (tile-based encoding and streaming) above.

It needs to be understood that tile-based encoding and streaming may be realized by splitting a source picture in tile rectangle sequences that are partly overlapping. Alternatively or additionally, bitstreams with motion-constrained tile sets may be generated from the same source content with different tile grids or tile set grids. We could then imagine the 360 degrees space divided into a discrete set of viewports, each separate by a given distance (e.g., expressed in degrees), so that the omnidirectional space can be imagined as a map of overlapping viewports, and the primary viewport is switched discretely as the user changes his/her orientation while watching content with a HMD. When the overlapping between viewports is reduced to zero, the viewports could be imagined as adjacent non-overlapping tiles within the 360 degrees space.

As explained above, in viewport-adaptive streaming the primary viewport (i.e., the current viewing orientation) is transmitted at the best quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP), which are typically aligned with (Sub)segments. In single-layer video bitstreams, SAPs are intra-coded and hence costly in terms of rate-distortion performance. Conventionally, relatively long SAP intervals and consequently relatively long (Sub)segment durations in the order of seconds are hence used. Thus, the delay (here referred to as the viewport quality update delay) in upgrading the quality after a viewing orientation change (e.g. a head turn) is conventionally in the order of seconds and is therefore clearly noticeable and annoying.

There are several alternatives to deliver the viewport-dependent omnidirectional video. It can be delivered, for example, as equal-resolution HEVC bitstreams with motion-constrained tile sets (MCTSs). Thus, several HEVC bitstreams of the same omnidirectional source content are encoded at the same resolution but different qualities and bitrates using motion-constrained tile sets. The MCTS grid in all bitstreams is identical. In order to enable the client the use of the same tile base track for reconstructing a bitstream from MCTSs received from different original bitstreams, each bitstream is encapsulated in its own file, and the same track identifier is used for each tile track of the same tile grid position in all these files. HEVC tile tracks are formed from each motion-constrained tile set sequence, and a tile base track is additionally formed. The client parses tile base track to implicitly reconstruct a bitstream from the tile tracks. The reconstructed bitstream can be decoded with a conforming HEVC decoder.

Clients can choose which version of each MCTS is received. The same tile base track suffices for combining MCTSs from different bitstreams, since the same track identifiers are used in the respective tile tracks.

Figure 9A:
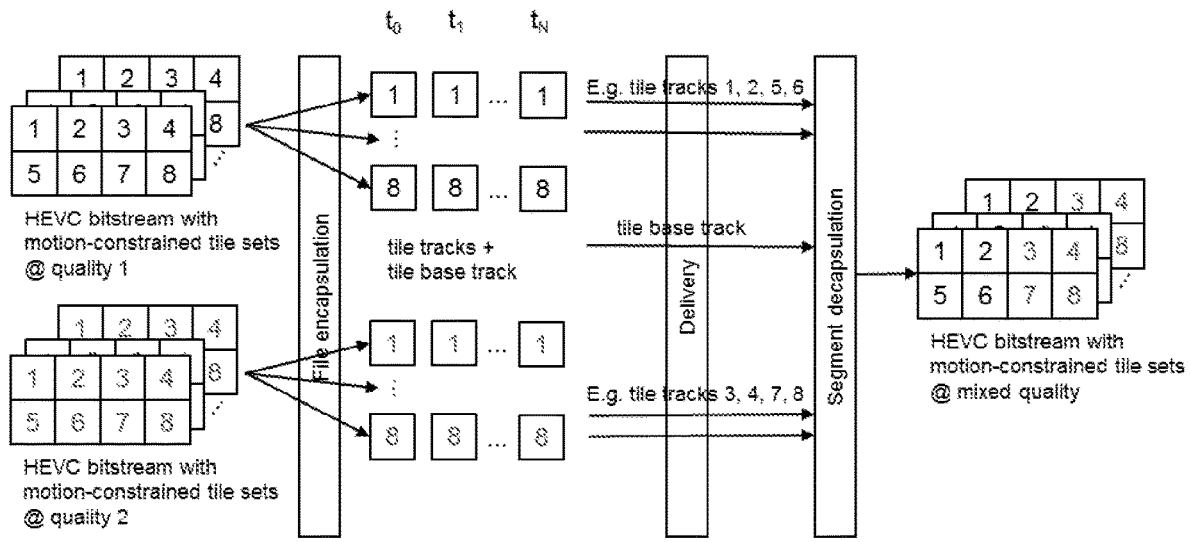
FIG. 9a shows an example of delivery of equal-resolution HEVC bitstreams with motion-constrained tile sets.

FIG. 9a shows an example how tile tracks of the same resolution can be used for tile-based omnidirectional video streaming. A 4×2 tile grid has been used in forming of the motion-constrained tile sets. Two HEVC bitstreams originating from the same source content are encoded at different picture qualities and bitrates. Each bitstream is encapsulated in its own file wherein each motion-constrained tile set sequence is included in one tile track and a tile base track is also included. The client chooses the quality at which each tile track is received based on the viewing orientation. In this example the client receives tile tracks 1, 2, 5, and 6 at a particular quality and tile tracks 3, 4, 7, and 8 at another quality. The tile base track is used to order the received tile track data into a bitstream that can be decoded with an HEVC decoder.

Figure 9B:
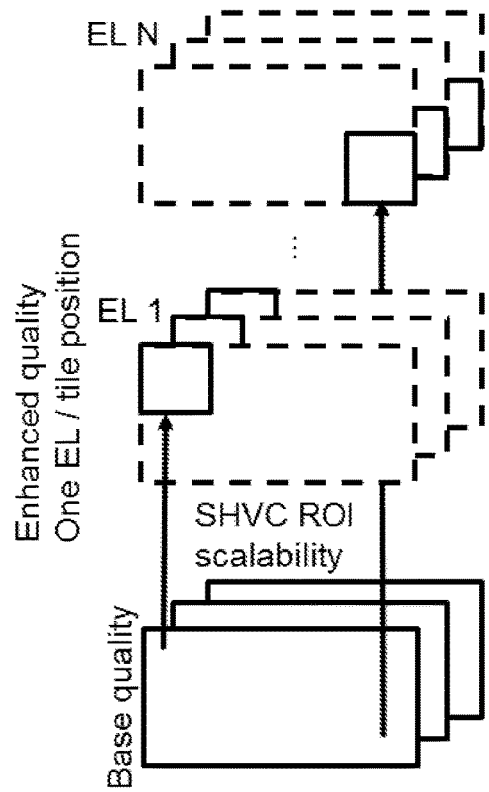
FIG. 9b shows an example of SHVC ROI scalability encoding.

Another option to deliver the viewport-dependent omnidirectional video is to carry out SHVC region-of interest scalability encoding. Therein, the base layer is coded conventionally. Additionally, region-of-interest (ROI) enhancement layers are encoded with SHVC Scalable Main profile. For example, several layers per each tile position can be coded, each for different bitrate or resolution. The ROI enhancement layers may be spatial or quality scalability layers. Several SHVC bitstreams can be encoded for significantly differing bitrates, since it can be assumed that bitrate adaptation can be handled to a great extent with enhancement layers only. This encoding approach is illustrated in FIG. 9b.

The base layer is always received and decoded. Additionally, enhancement layers (EL1, . . . , ELN) selected on the basis of the current viewing orientation are received and decoded.

Stream access points (SAPs) for the enhancement layers are inter-layer predicted from the base layer, and are hence more compact than similar SAPs realized with intra-coded pictures. Since the base layer is consistently received and decoded, the SAP interval for the base layer can be longer than that for ELs.

The SHVC ROI-based approach may also be implemented without inter-layer prediction, which is herein referred to as the no-ILP approach.

By comparing the performance of the tile-based approach (shown in FIG. 9a) to the SHVC ROI-based approach (shown in FIG. 9b), it has been observed that the bitrate of the SHVC ROI approach is significantly reduced (over 20% on average) compared to the bitrate of the tile-based approach. Thus, the SHVC ROI approach significantly outperforms MCTS-based viewport-dependent delivery in terms of bitrate reduction, and enabling inter-layer prediction provides a significant compression gain compared to using no inter-layer prediction.

However, the SHVC ROI approach has the some disadvantages. Inter-layer prediction is enabled only in codec extensions, such as the SHVC extension of HEVC. Such codec extensions might not be commonly supported in decoding, particularly when considering hardware decoder implementations. Moreover, the SHVC ROI approach as well as the no-ILP approach significantly increase the decoding complexity compared to the MCTS-based approach. For example, if a 4×2 tile grid is used, the enhancement layer in the SHVC ROI approach and in the no-ILP approach typically covers 2×2 tiles of the grid, i.e. require 50% decoding complexity increase.

Now in order to at least alleviate the above problems, embodiments for encoding and decoding shared coded pictures and for their utilization in bitstream switching are presented herein.

Figure 10:
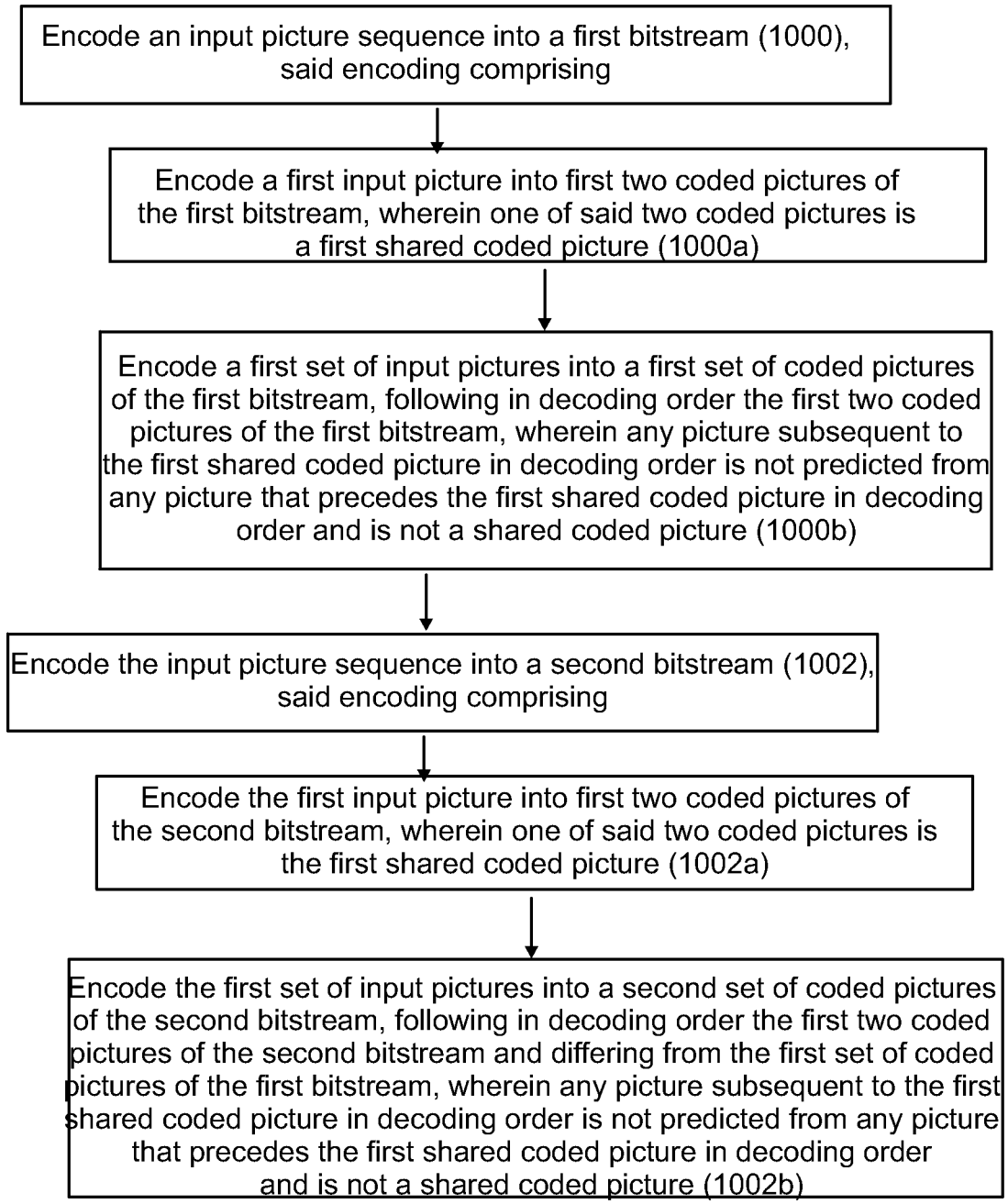
FIG. 10 shows a flow chart of an encoding method according to an embodiment of the invention.

In the encoding method, which is disclosed in FIG. 10, an input picture sequence is encoded into a first bitstream, said encoding comprising: encoding a first input picture into first two coded pictures of the first bitstream, out of which one is a first shared coded picture; and encoding a first set of input pictures into a first set of coded pictures of the first bitstream, following in decoding order the first two coded pictures of the first bitstream, wherein any picture subsequent to the first shared coded picture in decoding order is not predicted from any picture that precedes the first shared coded picture in decoding order and is not a shared coded picture. The method further comprises encoding the input picture sequence into a second bitstream, said encoding comprising: encoding the first input picture into first two coded pictures of the second bitstream, out of which one is the first shared coded picture; and encoding the first set of input pictures into a second set of coded pictures of the second bitstream, following in decoding order the first two coded pictures of the second bitstream and differing from the first set of coded pictures of the first bitstream, wherein any picture subsequent to the first shared coded picture in decoding order is not predicted from any picture that precedes the first shared coded picture in decoding order and is not a shared coded picture.

Figure 11:
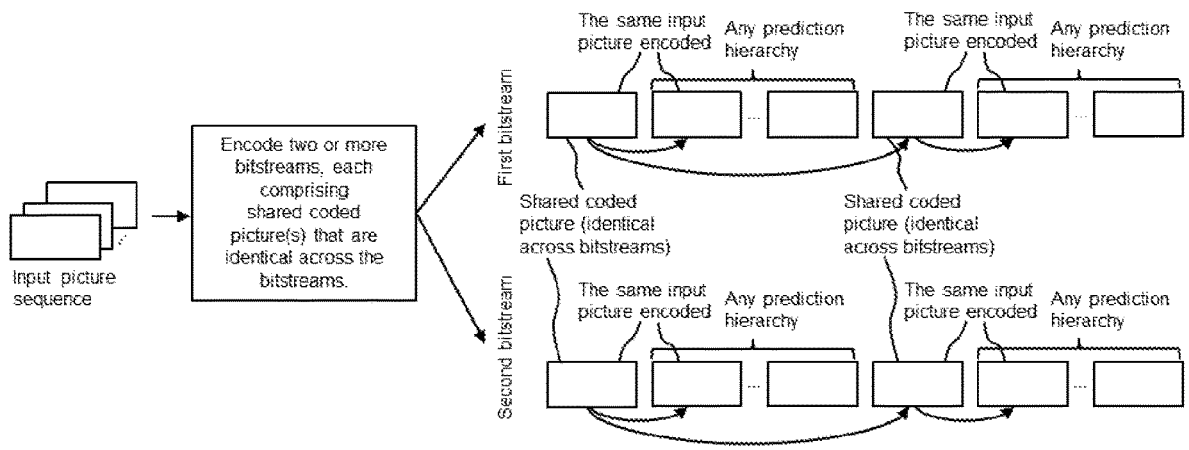
FIG. 11 shows an example of the encoding method according to an embodiment of the invention.

The above method can be further illustrated by referring to FIG. 11, which shows how the input picture sequence is encoded into two or more bitstreams, each representing the entire input picture sequence, i.e., the same input pictures are encoded in the bitstreams or a subset of the same input pictures, potentially with a reduced picture rate, are encoded in the bitstreams.

Certain input pictures are chosen to be encoded into two coded pictures in the same bitstream, the first referred to as a shared coded picture, and the two coded pictures may be referred to as a shared coded picture pair. A shared coded picture is either intra coded or uses only other shared coded pictures (or the respective reconstructed pictures) as prediction references. A shared coded picture in a first bitstream (of the encoded two or more bitstreams) is identical to the respective shared coded picture in a second bitstream (of the encoded two or more bitstreams), wherein "identical" may be defined to be identical coded representation, potentially excluding certain high-level syntax structures, such as SEI messages, and/or identical reconstructed picture. Any picture subsequent to a particular shared coded picture in decoding order is not predicted from any picture that precedes the particular shared coded picture and is not a shared coded picture.

The encoding method facilitates decoding a first bitstream up to a selected shared coded picture, exclusive, and decoding a second bitstream starting from the respective shared coded picture. No intra-coded picture is required to start the decoding of the second bitstream, and consequently compression efficiency is improved compared to a conventional approach. Similarly, the encoding method facilitates decoding a first bitstream up to a selected shared coded picture, inclusive, and decoding a second bitstream starting from the picture following the respective shared coded picture in decoding order.

According to an embodiment, an encoder indicates in or along the bitstream that a particular picture in the bitstream is a shared coded picture. An encoder may indicate a shared coded picture for example with a specific NAL unit type value that is used in all VCL NAL units of a shared coded picture. In another example, an encoder may indicate a shared coded picture with a specific SEI message associated with or included within the shared coded picture. According to an embodiment, a decoder decodes from or along the bitstream that a particular picture is a shared coded picture. A decoder may conclude for example by decoding a specific NAL unit type value attached to VCL NAL units of a picture that the picture is a shared coded picture. In another example, a decoder may conclude that a coded picture is a shared coded picture from a specific SEI message associated with or included within the coded picture.

According to an embodiment, a file writer indicates in a container file that a particular picture encapsulated in or along the container file is shared coded picture. A file writer may indicate a shared coded picture for example with a specific sample group. A file writer may decode from the bitstream, such as from a specific NAL unit type value or from a specific SEI message that a picture is a shared coded picture and accordingly indicate the shared coded picture in the container file. According to an embodiment, a file parser decodes from or along the container file that a particular coded picture is a shared coded picture. For example, a file writer may conclude that a coded picture is a shared coded picture from a specific sample group.

According to an embodiment, a file writer generates a timed metadata track for indicating shared coded pictures. The timed metadata track may be associated with one or more video tracks that comprise the same shared coded pictures, e.g. by using a track reference of a particular type. According to an embodiment, a streaming manifest is generated wherein the timed metadata track is included as a Representation. The timed metadata Representation is associated in the streaming manifest to the video Representations that it describes. For example, in DASH MPD, the @associationId attribute may be used for such association and the @associationType may be used for indicating the track reference type. According to an embodiment, a client parses from a streaming manifest the presence of a timed metadata Representation. The client may parse, for example from @associationType, which type of timed metadata Representation is available. The client may request and receive Segment(s) of the timed metadata Representation and conclude switching points by parsing said Segment(s).

According to an embodiment, an encoder indicates in or along the bitstream an identifier of a shared coded picture. The identifier may for example be an universally unique identifier (UUID) or a checksum (as discussed earlier), such as an MD5 checksum. UUID is usually a 128-bit number used to identify information in computer systems and may be derived from a media access control address (MAC address) and a present time (e.g. the encoding time of the shared coded picture, e.g. in terms of Coordinated Universal Time). The checksum may be derived from the VCL NAL units of the shared coded picture, or the checksum may be derived from the VCL NAL units of the shared coded pictures since the previous IRAP picture, inclusive, or the checksum derived from the reconstructed picture of the shared coded picture, or the checksum derived from all the reconstructed shared coded pictures since the previous IRAP picture, inclusive. The same identifier value for a first shared coded picture in a first bitstream and for a second shared coded picture in a second bitstream may indicate that the shared coded pictures are identical. An encoder may indicate the identifier value for example in a slice header provided that the picture is a shared coded picture. According to an embodiment, a decoder decodes from or along the bitstream an identifier of a shared coded picture. A decoder may conclude that switching from a first bitstream to a second bitstream is possible at a shared coded picture of the second bitstream when the identifiers of the respective (e.g. time-aligned) shared coded pictures in the first and second bitstreams is the same.

According to an embodiment, a file writer indicates in a container file an identifier of a identifier of a shared coded picture, where the identifier may for example be a UUID or a checksum as discussed above. According to an embodiment, a file parser decodes from or along the container file an identifier of a shared coded picture. A file parser may conclude that switching from a first encapsulated bitstream to a second encapsulated bitstream is possible at a shared coded picture of the second encapsulated bitstream when the identifiers of the respective (e.g. time-aligned) shared coded pictures in the first and second encapsulated bitstreams is the same.

According to an embodiment, an encoder or a file writer indicates in or along the bitstream that a shared coded picture is a non-output picture. An encoder may indicate for example in a picture parameter set and/or in a slice header, for example with a 1-bit syntax element, that a picture is output (i.e., is an output picture) or that a picture is not output (i.e., is a non-output picture). A file writer may indicate for example using a specific sample group or an invalid presentation time indicated in a container file that a picture is not output. As a response to decoding a non-output picture indication, the decoder does not output the reconstructed shared coded picture. As a response to parsing a non-output-picture indication from a container file, the file writer may omit displaying the reconstructed shared coded picture.

Figure 12:
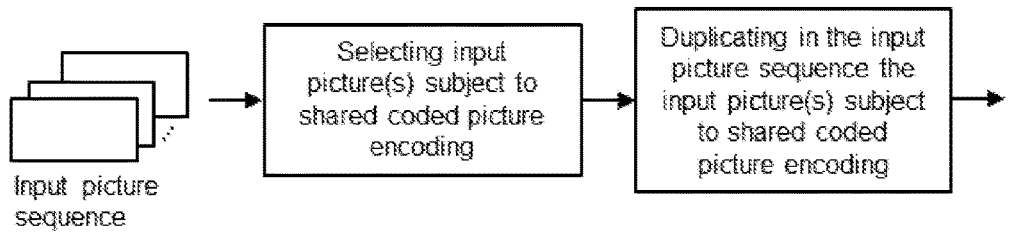
FIG. 12 shows an example of pre-processing operations according to an embodiment of the invention.

According to an embodiment, the encoder encodes pictures that are not shared coded pictures in the first and second bitstreams with different coding settings, which may differ e.g. in one or more of the following aspects:
  Bitrate
  Picture quality, which may be controlled for example by a different quantization step size for transform coefficients
  Picture rate (i.e. the first and second bitstreams may have different picture rates, but their respective shared coded pictures are aligned)
  Dynamic range (i.e. which value range of reconstructed samples allocate and/or how the value range is interpreted), tone mapping function, and/or optical transfer function
  Color gamut
  View According to an embodiment, prior to the encoding, one or more input pictures subject to shared coded picture encoding are selected and duplicated in the input picture sequence, as shown in FIG. 12. Herein, for example a period N (in terms of number of pictures) may be selected, and every Nth picture may be selected to be subject to shared coded picture encoding. N may be an integer multiple of the number of pictures in a hierarchical inter prediction structure that is configured to be used in encoding. Pictures that are subject to shared coded picture encoding within the input picture sequence are duplicated in the modified input picture sequence, while other picture of the input sequence are included once in the modified input picture sequence. The order of pictures stays unchanged in the modified input picture sequence compared to that in the input picture sequence. The modified input picture sequence is used as the picture sequence that is encoded.

According to an embodiment, the encoder is configured to obey the constraints for shared coded pictures and the constraints applying the other pictures with respect to the shared coded pictures, as mentioned above. According to an embodiment, the potential reference pictures may be indicated to the encoder, wherein the shared coded pictures are indicated to use only other shared coded pictures as reference, and any other picture is not predicted from any picture that precedes the previous shared coded picture in decoding and is not a shared coded picture. According to an embodiment, the encoder may be configured so that the shared coded pictures reside in temporal sub-layer 0 and the other coded pictures reside in temporal sub-layer greater than 0, and the first picture following a shared coded picture in decoding order is configured to be a TSA picture.

According to an embodiment, Representations are formed from bitstreams containing shared coded pictures in temporal sub-layer 0 and other coded pictures in temporal sub-layers greater than 0 as follows. The temporal sub-layer 0 are encapsulated into a first track and a first Representation. The temporal sub-layer(s) greater than 0 of a first bitstream are encapsulated into a second track and a second Representation. The second track may implicitly or explicitly extract temporal sub-layer 0 from the first track. The temporal sub-layer(s) greater than 0 of a second bitstream are encapsulated into a third track and a third Representation. The third track may implicitly or explicitly extract temporal sub-layer 0 from the first track. A streaming manifest containing the first, second, and third Representations is formed, wherein the second and third Representations are indicated to depend on the first Representation, e.g. with the @dependencyId attribute of DASH. The second and third Representations are indicated to be alternatives to each other in the streaming manifest, e.g. by including them in the same Adaptation Set. TSA pictures of the second and third Representations are considered SAPs and may be indicated as SAPs in the streaming manifest and/or in the (Sub)segments of the second and third Representations.

According to an embodiment, a client parses streaming manifest containing the first, second, and third Representations, wherein the second and third Representations are indicated to depend on the first Representation, e.g. with the @dependencyId attribute of DASH. The client continuously receives the first Representation, since it is needed for reconstruction of both the second and third Representations. The client parses from the streaming manifest that the second and third Representations are alternatives to each other, and accordingly receives (Sub)segments of either the second or third Representations. The client may decide to switch from receiving (Sub)segments of the second Representation to the third Representation, or vice versa. Switching may take place at an indicated SAP position, which corresponds to a TSA picture as explained above. The second track (corresponding to the second Representation) and the third track (corresponding to the third Representation) may implicitly or explicitly extract temporal sub-layer 0 from the first track (corresponding to the first Representation). By resolving the implicit or explicit extraction, the received (Sub)segements of the second and third Representations may be processed and decoded as a single concatenated sequence of (Sub)segments, and a single concatenated bitstream encapsulated therein. Decoding as a concatenation may refer to decoding a sequence of coded pictures decapsulated in decoding order from a sequence of (Sub)segments that may be taken or extracted from different bitstreams and/or Representations. In other words, decoding as a concatenation may be understood as decoding a bitstream that is formed from the coded pictures or access units of from non-overlapping (Sub)segments that may originate from different bitstreams and/or Representations. For example, a decoder may decode a concatenation of coded pictures of a first (Sub)segment received in a first bitstream or Representation and coded pictures of a next (Sub)segment received in a second bitstream or Representation.

Picture quality of a shared coded picture may but needs not be chosen to be such that it corresponds to the picture quality of the bitstream with the lowest bitrate among the encoded two or more bitstreams. According to an embodiment, when encoding the bitstream with the lowest bitrate among the encoded two or more bitstreams, a second coded picture encoded from the same input picture as a shared coded picture may be coded with certain constraints using the shared coded picture as reference. For example, zero-valued motion vectors and no prediction error coding may be enforced for the second coded picture. Consequently, the second coded picture has a negligible impact in the rate-distortion in the bitstream with the lowest bitrate among the encoded two or more bitstreams. According to an embodiment, an encoder indicates in the bitstream, for example in an SEI message, encoding constraints that were applied in the second coded picture or respective decoding operations that can be omitted when decoding the second coded picture. According to an embodiment, an encoder indicates in the bitstream, for example in an SEI message, that the reconstructed second picture is identical to the reconstructed shared coded picture. According to an embodiment, encoding of the second coded picture in the bitstream with the lowest bitrate among the encoded two or more bitstreams is omitted. According to an embodiment, a decoder decodes from the bitstream, for example from an SEI message, encoding constraints that were applied in the second coded picture (that is following a shared coded picture in decoding order) or respective decoding operations that can be omitted when decoding the second coded picture, and the decoder omits the decoding operations accordingly when decoding the second coded picture. According to an embodiment, a decoder decodes from the bitstream, for example from an SEI message, that the reconstructed second picture is identical to the reconstructed shared coded picture, and accordingly the decoder omits the decoding of the second coded picture, and copies the reconstructed shared coded picture to the reconstructed second coded picture or uses the reconstructed shared coded picture as the reconstructed second coded picture.

The encoding operations may be carried out by a single-layer encoder, such as HEVC Main profile encoder. The encoding achieves rate-distortion compression gain through functionality similar to inter-layer prediction, i.e. improving the rate-distortion performance compared to the no-ILP approach. The reconstructed pictures generated by a decoder are identical to those generated by an encoder, i.e. the presented method does not involve an error or drift in decoding.

According to an embodiment, a streaming manifest is authored in a manner that bitstreams or tracks that have the same shared coded pictures are indicated to be alternatives to each other, i.e. only one of them should be received for a particular time period. For example, a DASH MPD is authored so that tracks the have the same shared coded pictures form Representations of the same Adaptation Set.

According to an embodiment, a streaming manifest (such as DASH MPD) and/or a container file and/or Segment(s) for streaming are authored so that shared coded pictures are indicated to be switching points from one Representation or track to another.

According to an embodiment, Segments for Representations are authored in a manner that they start with a shared coded picture or a stream access point, and switching points are indicated in a streaming manifest to coincide with the start of Segments.

According to an embodiment, the tracks representing the same input picture sequence but comprising different bitstreams encoded with embodiments above are treated as Representations in DASH. The Representations are included in the same Adaptation Set. Preferably Segments are formed in a manner that they start with a shared coded picture. As described above, the Switching element of DASH is included in the MPD to indicate with the @interval attribute that shared coded pictures and streaming access points starting a Segment are switch-to opportunities. @type may be set to "bitstream" to indicate possibility for decoding and presenting switch-from Representation up to switch point t, and continuing decoding and presenting the switch-to Representation from time t onwards. @type equal to "bitstream" also indicates that initialization of the switch-to Representation is not necessary and is not recommended.

DASH MPD signaling as described above is suitable for indicating switching opportunities on Segment basis. However, particularly for on-demand content (rather than live content), Subsegments rather than Segments may be primarily used. According to an embodiment, Subsegments are formed in a manner that they start with a shared coded picture or a stream access point, and switching points are indicated in a container file or in Segment(s) to coincide with the start of Subsegments. In an embodiment, the SegmentIndexBox is appended or another box enabling Subsegment-specific signaling is introduced to include a first indication whether the Subsegment starts with a shared coded picture. Several tracks or Representations are indicated, with a second indication, to be such that switching from one of them to another is possible when a Subsegment is indicated, with the first indication, to start with a shared coded picture in either of the above-mentioned boxes. The second indication may reside in the MPD, e.g. in a SupplementalProperty, or either of the above-mentioned boxes. The second indication may for example be an identifier, and the same identifier value indicates that the tracks or Representations are such that switching from one of them to another is possible when a Subsegment is indicated, with the first indication, to start with a shared coded picture in either of the above-mentioned boxes.

According to an embodiment, a client parses from a streaming manifest and/or Segment(s) that a set of Representations are alternatives to each other. For example, the client may conclude from a DASH MPD that Representations of an Adaptation Set are alternatives to each other. The client parses, from a streaming manifest (such as DASH MPD) and/or Segment(s), indications of switching points from one Representation to another. The client determines to switch from a currently received Representation to a second Representation, for example on the basis that the bitrate of the second Representation matches the reception bitrate more closely than the bitrate of the currently received Representation. The client concludes from the indications of switching point a next (Sub)Segment of the second Representation comprising (and preferably starting with) a switching point and requests said next (Sub)Segment from a server. The client receives the next (Sub)Segment that comprises (and preferably starts with) a shared coded picture that acts as a switching point. The client decodes the next (Sub)Segment, wherein the decoding may happen with the same decoder instance as was used before Representation switching, without re-initialization of the decoder instance.

According to an embodiment, a client parses from a streaming manifest (such as DASH MPD) that Segments for Representations are authored in a manner that switching points coincide with the start of Segments.

The above embodiments may be used with tile-based viewport-dependent delivery. Some embodiments related thereto are disclosed in more details below.

According to an embodiment, a source picture sequence is encoded using MCTSs into a first bitstream and the same source picture sequence is encoded using MCTSs (of the same MCTS grid) also to a second bitstream. The first MCTS of the first bitstream is encapsulated as a first track, and the first MCTS of the second bitstream is encapsulated as a second track. The second MCTS of the first bitstream is encapsulated as a third track, and the second MCTS of the second bitstream is encapsulated as a fourth track.

According to an embodiment, a first sub-picture sequence and a second sub-picture sequence are generated from a source picture sequence. The first sub-picture sequence is encoded using motion-constrained pictures into a first bitstream and the first sub-picture sequence is encoded using motion-constrained pictures also to a second bitstream. The second sub-picture sequence is encoded using motion-constrained pictures into a third bitstream and the second sub-picture sequence is encoded using motion-constrained pictures also to a fourth bitstream. The first bitstream is encapsulated as a first track, the second bitstream is encapsulated as a second track, the third bitstream is encapsulated as a third track, and the fourth bitstream is encapsulated as a fourth track.

Figure 13A:
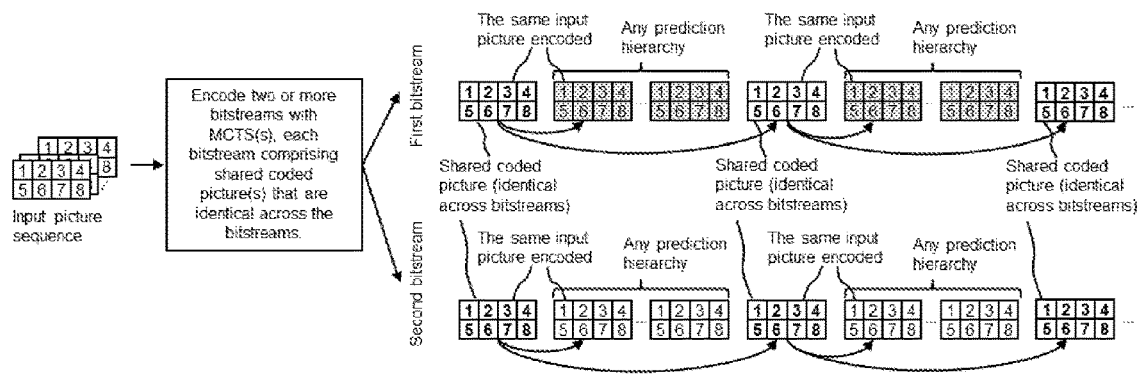

FIG. 13a shows an embodiment for encoding video content for viewport-dependent delivery. In FIG. 13a, the shared coded pictures are indicated by bold font, whereas the other pictures in the first bitstream are indicated by a normal font with grey shading and the other pictures in the second bitstream are indicated by a normal font without shading The picture area is partitioned into a tile set grid according to which motion-constrained tile sets are encoded. In the example, the picture area is partitioned to a 4×2 tile set grid, but it needs to be understood that in general any tile grid can be used. Similarly to earlier embodiments, certain input pictures are chosen to be encoded into two coded pictures in the same bitstream, where a shared coded picture, as defined earlier, is encoded as the first of the two coded pictures, in decoding order. For example, the first input picture and then every Nth input picture may be selected to be subject to shared coded picture encoding. The other input pictures can be coded conventionally, with any prediction hierarchy such that any picture subsequent to a particular shared coded picture in decoding order is not predicted from any picture that precedes the particular shared coded picture and is not a shared coded picture. As discussed earlier, two or more bitstreams are encoded from the same source picture sequence, e.g. each having a different bitrate.

The above method may be used in a case where a single tile set covers the picture area, when motion vectors are constrained in a manner that they do not cause a prediction block to refer to a sample location outside the reference picture (or analogously do not cause a need to saturate a sample location to be used in a prediction block to be within the reference picture), and that no sample value at a fractional sample position that is derived using one or more sample locations outside the reference picture (or analogously that the derivation does not require saturation of sample locations within the reference picture). Encoding or coded pictures with the mentioned constraints may be referred to as motion-constrained (coded) pictures. FIG. 13b illustrates an example, where the input picture sequence may be partitioned into tile rectangle sequences (a.k.a. sub-picture sequences) prior to encoding. Each tile rectangle sequence may then be encoded independently, wherein the above constraint is applied in the encoding. Two or more bitstreams are encoded from the same tile rectangle sequence, e.g. each having a different bitrate.

For the approaches that are illustrated with FIGS. 13a and 13b, MCTSs or coded tile rectangle sequences are encapsulated into a file either as tile tracks or as sub-picture tracks (e.g. 'hvc1' or 'hev1' tracks for HEVC). For tile tracks, a tile base track is also created. For sub-picture tracks, one or more extractor tracks for converting MCTSs or coded tile rectangles from other tracks into a full-picture-compliant bitstream are created.

The tile or sub-picture tracks are made available for streaming and/or decoding in a manner that the client can select which bitstream out of the two or more bitstreams that were encoded is used for streaming and/or decoding on tile or sub-picture track basis. Embodiments related to streaming may be applied, as discussed earlier. For example, each bitstream of the two or more bitstreams or each respective tile or sub-picture track may be announced in a streaming manifest, such as DASH MPD. For example, the tile or sub-picture tracks may be made available in DASH. When generating a DASH MPD, a Representation included in the MPD may be correspond to a tile or sub-picture track, i.e. the tile or the sub-picture tracks can be made available as DASH Representations. The tile or sub-picture tracks of the same tile location, of the same tile grid, and of the same spatial resolution can be considered to represent the same input picture sequence and may be included in the same Adaptation Set in the DASH MPD.

According to an embodiment, the first, second, third, and fourth tracks are obtained e.g. using the embodiment above wherein a source picture sequence is encoded using MCTSs into a first bitstream and to a second bitstream, or using the embodiment above wherein a first sub-picture sequence and a second sub-picture sequence are generated from a source picture sequence and the first sub-picture sequence is encoded using motion-constrained pictures into a first bitstream and the first sub-picture sequence is encoded using motion-constrained pictures also to a second bitstream. A collection track is generated or obtained, wherein the collection track extracts coded data from the first or second track, whichever is available when extraction is resolved, and from the third or fourth track, whichever is available when extraction is resolved. A streaming manifest, such as DASH MPD, is authored, wherein said authoring comprises at least one of including a collection track as a collection Representation in the streaming manifest;

including the first and second track as a first and second Representation, respectively, in the streaming manifest, indicating, in the streaming manifest, that the first and second Representations are alternatives to each other for extraction into the collection Representation, including the third and fourth track as a third and fourth Representation, respectively, in the streaming manifest, and indicating, in the streaming manifest, that the third and fourth Representations are alternatives to each other for extraction into the collection Representation.

According to an embodiment, the authoring of the streaming manifest further comprises indicating in the streaming manifest that a first collection item comprises the first and second track, and indicating in the streaming manifest that a second collection item comprises the third and fourth tracks, and/or indicating in the streaming manifest that the collection Representation extracts data or depends on the first collection item and second collection item.

According to an embodiment, the authoring of the streaming manifest further comprises indicating in the streaming manifest a reference from the collection Representation to the first collection item and the second collection item, and/or a reference to the collection Representation from the first collection item and the second collection item.

As discussed with earlier embodiments, the client may also be made aware of the possibility to use shared coded picture to switch from one bitstream to another. According to an embodiment Segments for the first, second, third, and fourth Representations are authored in a manner that they start with a shared coded picture or a stream access point, and the authoring of the streaming manifest further comprises indicating in the streaming manifest that switching points coincide with the start of Segments.

According to an embodiment, a client operation comprises at least one of
- parsing, from a streaming manifest, that a collection Representation in the streaming manifest;
- parsing, from the streaming manifest, that a first Representation and a second Representation are alternatives to each other for extraction into the collection Representation,
- selecting the first or the second Representation for extraction into the collection Representation,
- parsing, from the streaming manifest, that a third Representation and a fourth Representation are alternatives to each other for extraction into the collection Representation, and
- selecting the third or the fourth Representation for extraction into the collection Representation.

According to an embodiment, the client operation further comprises at least one of
- requesting and receiving (Sub)segments of the collection Representation;
- requesting and receiving (Sub)segments of the selected first or second Representation;
- requesting and receiving (Sub)segment of the selected third or fourth Representation; and
- resolving the (Sub)segments of the collection Representation by extracting data from the selected first or second Representation and from the selected third or fourth Representation.

According to an embodiment, the client operation further comprises
- performing one or both following switching operations:
  - subsequent to requesting and receiving (Sub)segments of the selected first or second Representation, selecting the other one from the first or second Representation, and requesting and receiving (Sub)segments of the selected other one from the first or second Representation; and
  - subsequent to requesting and receiving (Sub)segments of the selected third or fourth Representation, selecting the other one from the third or fourth Representation, and requesting and receiving (Sub)segments of the selected other one from the third or fourth Representation;
- continuing to resolve the (Sub)segments of the collection Representation by extracting data from the first or second Representation, whichever is requested and received, and from the selected third or fourth Representation, whichever is requested and received.

In an embodiment, the client determines switching from requesting and receiving (Sub)segments of the first or second Representation to (Sub)segments of the second or first Representation, respectively, and/or switching from requesting and receiving (Sub)segments of the third or fourth Representation to (Sub)segments of the fourth or third Representation, respectively, may be determined by the client due to one or more of the following reasons:
- bitrate adaptation, e.g. the bitrate of the selected other one from the first or second Representation and/or the bitrate of the selected other one from the third or fourth Representation matches the available reception bitrate more closely than the bitrate of the earlier selected Representation;
- buffer occupancy control, e.g. an occupancy level of the reception buffer for the first or second Representation and/or the third or fourth Representation is too low (danger for not receiving data in time for decoding and playback) or too high (under-utilization of the available bandwidth and memory wastage in the client);
- viewing orientation change, e.g. a viewport for displaying changed from area covered by the first or second Representation to the area covered by the third or fourth Representation, or vice versa.

According to an embodiment, the client operation further comprises at least one of
- parsing, from the streaming manifest, indications of switching points;
- concluding from the indications a first next (Sub)segment of the selected other one of the first or second Representation comprising (and preferably starting with) a switching point and/or a second next (Sub)segment of the selected other one of the third or fourth Representation comprising (and preferably starting with) a switching point; and
- performing said one or both switching operations starting from the first next (Sub)segment and/or the second next (Sub)segment.

According to an embodiment, the first and second tracks represent a first view (e.g. the left view) and the third and fourth tracks represent a second view (e.g. the right view). The first, second, third, and fourth tracks may represent (motion-constrained) sub-pictures, MCTSs, or motion-constrained pictures. A collection track is generated, wherein the collection track extracts coded data from the first or second track, whichever is available when extraction is resolved, and from the third or fourth track, whichever is available when extraction is resolved. A resolved collection track may therefore represent a stereoscopic frame-packed video bitstream. The above-described embodiments may then be applied to this set of first, second, third, fourth, and collection tracks. This embodiment enables clients to perform individual decisions on whether the first or second track is received, and whether the third or fourth track is received, but still use a single decoder instance for decoding the content. Moreover, clients capable of decoding or displaying only monoscopic content can receive and decode only one view of the content.

As a consequence of the above embodiments, the decoding of the resolved collection Representation may happen with the same decoder instance as was used before performing said one or both switching operations, without re-initialization of the decoder instance.

In the example of FIG. 13c, the same notation as in FIG. 13a is used, i.e. the shared coded pictures are indicated by bold font, whereas the other pictures in the first bitstream are indicated by a normal font with grey shading and the other pictures in the second bitstream are indicated by a normal font without shading. Therein, it is assumed that shared coded pictures are coded periodically and that the client made a decision to switch from bitstream 1 to bitstream 2 for tile tracks 1, 2, 5, 6 and vice versa for the other tile tracks at the shared coded picture tN+1. Such a switch may be taken for example to respond to a changed head orientation when viewing 360-degree video with a head-mounted display. It can be observed that no intra-coded pictures are required for switching between the bitstreams, hence the rate-distortion performance of the transmitted/received stream is improved compared to conventional approaches. It can also be seen that a single-layer bitstream is generated, and thus a single instance of a single-layer decoder is sufficient for the decoding the bitstream. Naturally, it would also be possible to use multiple decoder instances, e.g. one per tile track. Moreover, despite the fact that the switching from one bitstream to another at a position without a stream access point, re-initialization of the decoder instance(s) is not needed.

In the example of FIG. 13c, the use of tile tracks and a tile base track is illustrated but it needs to be understood that the example figure could have been likewise using sub-picture tracks and one or more extractor tracks for representing full-picture-compliant compositions of MCTSs or sub-pictures from other tracks.

Figure 14A:
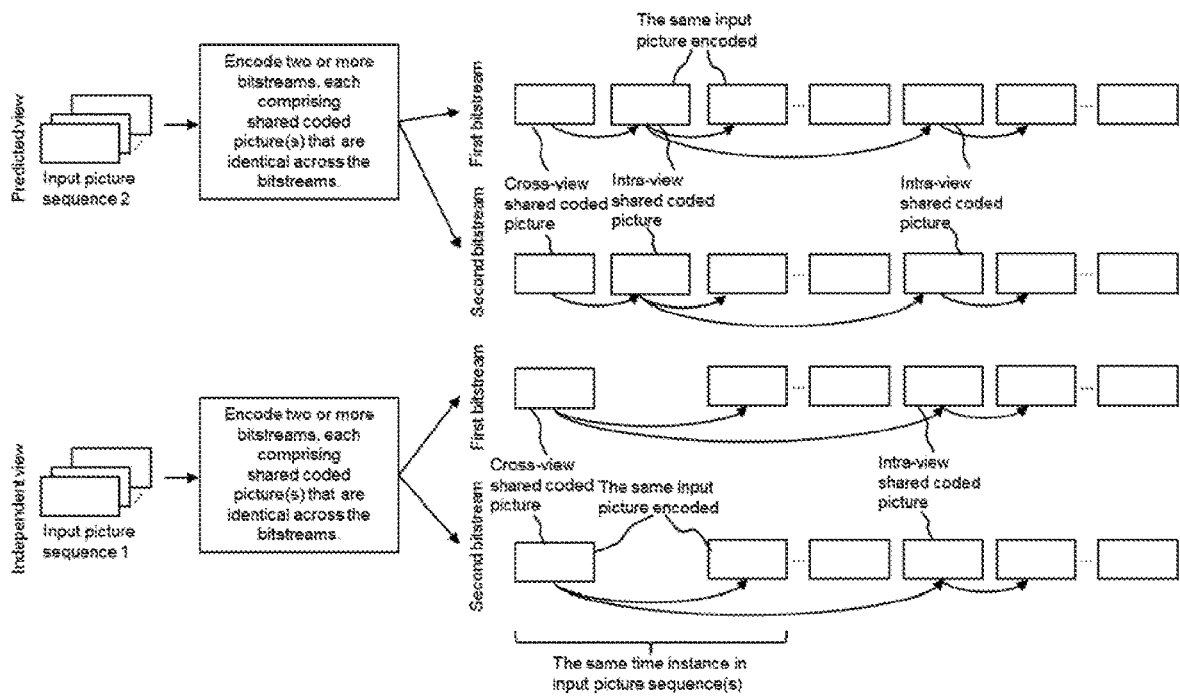
FIGS. 14a and 14b show examples of using constrained inter-view prediction with separate bitstreams for the views according to various embodiments of the invention.

The above method may also be used jointly with constrained inter-view prediction, where separate bitstreams allocated for different views. FIG. 14a illustrates how the method is applied for two views, an independent view and a dependent view, where constrained inter-view prediction is applied between views. There are two input picture sequences, one for the independent view and another for the predicted view. Preferably, the input picture sequences comprise time-aligned pictures. Each input picture sequence is encoded into two or more bitstreams, each representing the entire input picture sequence, i.e., the same input pictures are encoded into the bitstreams or a subset of the same input pictures, potentially with a reduced picture rate, are encoded into the bitstreams.

According to an embodiment, an intra-coded picture of the independent view, such as the independent view of FIG. 14a, which may have further constraints e.g. sufficient for labeling it as an IRAP picture in HEVC, is selected as a cross-view shared coded picture. The same cross-view shared coded picture of a time instance is coded into all bitstreams, including the bitstreams for the predicted view.

Figure 14B:
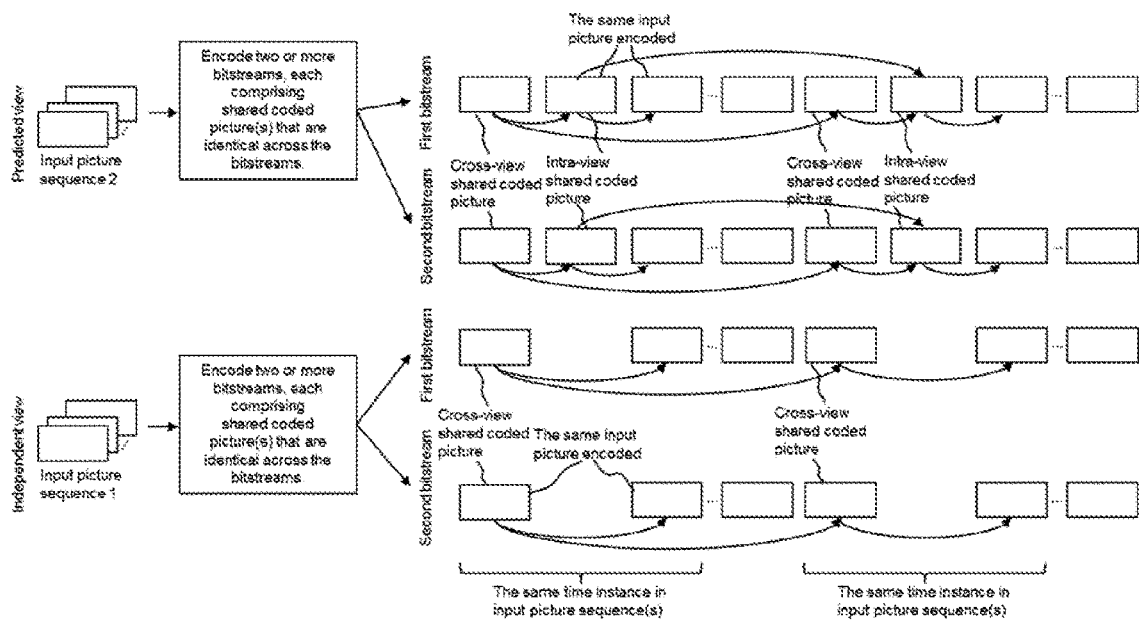

According to another embodiment, a cross-view shared coded picture may be predicted from other cross-view shared coded pictures but not from any other pictures. The embodiment is illustrated in FIG. 14b.

In both embodiments (FIGS. 14a and 14b), the cross-view shared coded picture within a bitstream of the independent view is treated like a shared coded picture in the single-view coding embodiments. Otherwise, the encoding of the independent view bitstream is like the encoding of the single-view bitstream in single-view coding embodiments. It is noted that shared coded pictures that are not shared with the predicted view may be encoded as in the single-view coding embodiments and may be referred to as intra-view shared coded pictures.

According to an embodiment for the predicted view coding, a cross-view shared coded picture is followed in decoding order by an intra-view shared coded picture, which is predicted from the cross-view shared coded picture. The cross-view shared coded picture is preferably not used for predicting any other pictures than the immediately following intra-view shared coded picture, although such predictions may be enabled in some embodiments. Otherwise, the encoding of the predicted view bitstream is like the encoding of the single-view bitstream in single-view coding embodiments. It is noted that intra-view shared coded pictures may be encoded and they may but need not be aligned with intra-view shared coded pictures of the independent view.

Each bitstream of the predicted view is encapsulated in a track in a manner that the cross-view shared coded picture is included by reference to a track comprising an independent view bitstream. Inclusion by reference may be performed using extractors.

It is noted that the embodiments for tile-based viewport-dependent delivery and the embodiments for the use of constrained inter-view prediction can be combined.

The above embodiments related to constrained inter-view prediction with separate bitstreams have the benefit that constrained inter-view prediction is enabled, thereby providing considerable bitrate reduction, e.g. on average 20% bitrate reduction with some video clips and encoding configurations.

Figure 15:
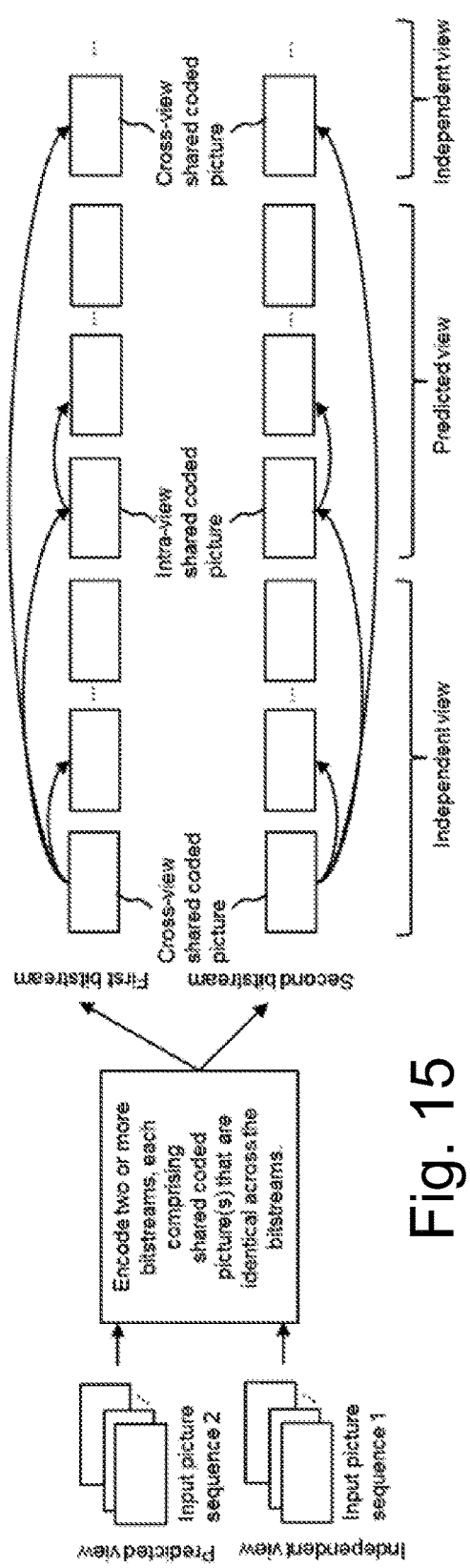
FIG. 15 shows an example of using constrained inter-view prediction with common bitstream for the views according to an embodiment of the invention.

The above method may also be used jointly with constrained inter-view prediction, where all views are coded in the same bitstream. FIG. 15 illustrates how the method is applied for two views, an independent view and a dependent view, where constrained inter-view prediction is applied between views and when the views are coded into one single-layer bitstream. There two input picture sequences, one for the independent view and another for the predicted view. Preferably, the input picture sequences comprise time-aligned pictures. The input picture sequences are encoded jointly into two or more bitstreams, each representing both input picture sequences.

A cross-view shared coded picture is a picture of the independent view that is intra-coded or predicted from other cross-view shared coded pictures.

An intra-view shared coded picture is predicted from cross-view shared coded pictures or other intra-view shared coded pictures of the same view.

Pictures of the independent view and of the predicted view may be interleaved e.g. on the basis of every subsequence of pictures starting with a shared coded picture, as illustrated in FIG. 15. Other types of interleaving are also possible, such as having every other picture from the independent view and the remaining pictures from the predicted view.

Pictures that are not shared coded pictures may be predicted from
    other pictures of the same view that succeed, in decoding order, the previous shared coded picture in decoding order,
    the intra-view shared coded pictures of the same view, and/or
    the cross-view shared coded pictures.

According to an embodiment, the bitstream is encapsulated in a track. This embodiment may be used when a single decoder is used to decode both views.

According to an embodiment, coded pictures of the independent view of the bitstream are encapsulated into a first track, and a second track is formed from the cross-view shared coded pictures included by reference to a track comprising an independent view bitstream and from the coded pictures of the predicted view. Inclusion by reference may be performed using extractors.

Shared coded pictures may be categorized in one or both of the following properties:
    Intra-coded (or intra random access point) and predicted shared coded pictures.
    Stream access properties, similar to those of SAP types. Type 1 may indicate that all pictures following a shared coded picture pair, in decoding order, also follow that in output order, and that pictures following the shared coded picture in decoding are not predicted from pictures preceding, in decoding order, the shared coded picture. Type 2 may indicate that all pictures following a shared coded picture pair, in decoding order, may precede or follow that in output order, and that pictures following the shared coded picture in decoding order are not predicted from pictures preceding, in decoding order, the shared coded picture. Type 3 may indicate that pictures following the shared coded picture in decoding order may be predicted from shared coded pictures preceding, in decoding order, the shared coded picture but are not predicted from any other picture preceding, in decoding order, the shared coded picture.

According to an embodiment, an encoder indicates in or along the bitstream one or both of the above-mentioned properties for a shared coded picture. According to an embodiment, a decoder decodes from or along the bitstream one or both of the above-mentioned properties for a shared coded picture.

The DASH MPD or Subsegment signaling as described above may comprise one or both of the above-mentioned properties.

The DASH standard, as presently defined in ISO/IEC 23009-1, may have some problems relating to certain use cases of tile or sub-picture tracks and extractor tracks. For example, there is inconsistency in the direction of @dependencyId is used for Representation corresponding to tile base tracks (which may be referred to as tile base Representations) and extractor tracks (which may be referred to as extractor Representations). It has been suggested that the identifier of the tile base Representation of an 'hvtl' Representation is given by @dependencyId. Extractor Representations, when used to extract data from tile tracks or sub-picture tracks, depend on Representations containing tile tracks or motion-constrained sub-picture tracks. Hence Extractor Representations contain @dependencyId pointing to tile or sub-picture Representations. Thus, the use of @dependencyId is opposite in these use cases, which are otherwise similar.

While HEVC tile tracks cannot be consumed independently without extensions to standard HEVC decoding process, sub-picture tracks are similar to conventional video tracks. For example, HEVC sub-picture picture tracks are conventional HEVC tracks, which can be decoded with a standard HEVC decoding process. Consequently, the Extractor Representations as described above are optional for clients and merely assist in reducing the number of decoder instances. Sub-picture Representations are not be indicated to mandatorily depend on Extractor Representations.

As discussed above, it is possible to encapsulate the same sub-picture sequence in three ways:
  Tile track
  Sub-picture track with motion constraints
  Sub-picture track without motion constraints More than one of the above types may be used in content generation. It would make sense to include Representations covering the same sub-picture in the same Adaptation Set regardless of which type of encapsulation has been used. Moreover, the same sub-picture may be available in multiple resolutions, which should also be included in the same Adaptation Set.

Moreover, there may be an explosion of the number of extractor Representations. Sub-picture tracks of different bitstreams of the same resolution can be made functionally equivalent for extractors by using the same track_ID in all these tracks and by including only one slice per sub-picture (having the consequence that the number of extracted bytes does not need to be exactly expressed, i.e. data_length can be set to point beyond the sample boundary in all the sub-picture bitstreams). However, @dependencyId is currently specified to point from the extractor Representation to each complementary Representation, i.e. each sub-picture Representation. @dependencyId can supposedly be interpreted to indicate unconditional dependency, i.e. in order to decode an extractor Representation, all the indicated complementary sub-picture Representations have to be obtained. Consequently, an extractor Representation for each possible combination of sub-picture Representations would be needed, which can be an excessive number.

Spatial Relationship Descriptor (SRD) is used to express two-dimensional spatial relationships between Spatial Objects. A Spatial Object is represented by either an Adaptation Set or a Sub-Representation. As an example, SRD may be used to indicate the location and size of sub-picture Representations relative to each other. A more generic mechanism than SRD is preferred to indicate a tile base Representation or an extractor Representation collecting. A need for a generic mechanism would be particularly true for omnidirectional video, for which the sphere coverage of a Representation will supposedly be indicated by a different descriptor than SRD.

It has been proposed that the client has to understand that all Adaptation Sets that have a @dependencyId to the tile base Representation need to be processed to obtain meaningful presentation from the tile base Representation. However, this requirement is not indicated in the proposed semantics. This requirement seems to be implicitly imposed for tile base Representations. More clarity is desirable, and the feature should not be specific to HEVC.

The above drawbacks can be at least alleviated by introducing a collection representation, where Segments of a collection Representation contain instructions to compose a media stream from Segments of collection item Representations. A collection Representation alone without collection item Representations does not lead to a meaningful presentation.

A collection Representation may contain an EssentialProperty with @schemeIdUri equal to "urn:mpeg:dash:collection:2018". @value is a comma-separated list of alpha-numeric UTF-8 identifiers, the first being referred to as collectionId and all subsequent ones to as collectionItemId. collectionId and at least two collectionItemId values may be present.

A collection item Representation may be referred to by a collection Representation to compose a media stream out of many collection item Representations. A collection item Representation alone may lead to a meaningful presentation.

A collection item Representation may contain a SupplementalProperty with @schemeIdUri equal to "urn:mpeg:dash:collectionItem:2018". @value is a comma-separated list of exactly two alpha-numeric UTF-8 identifiers, the first being referred to as collectionId and the second being referred to as collectionItemId. collectionId identifies the collection Representation in which this collection item Representation may be used for composing a media stream. Representations that have the same values of collectionId and collectionItemId are equivalent for composing a media stream corresponding to a collection Representation with that collectionId value.

The use of the above-specified property descriptors may be constrained as follows.
  Segments and Subsegments of all collection and collection item Representations with the same collectionId value are aligned, i.e. if the collection and collection item Representations were in the same Adaptation Set, Segments and Subsegments of these Representations are such that it would be possible to set @subsegmentAlignment in all these Representations to the same value that is not equal to false.

All collection and collection item Representations with the same collectionId value have the same Initialization Segment.

The concatenation of the common Initialization Segment, followed by concatenated Subsegments for each Subsegment index j represent a Subsegment sequence conforming to the media format as specified in the @mimeType attribute for the collection Representation, where concatenated Subsegments are defined as follows:

Let the collectionId of a collection Representation be equal to cId.

Let there be N collectionItemId values cItemId[i] with i in the range of 0 to N−1, inclusive.

Let a sequence of Subsegments ss[cItemId[i]][j] for a collection item cItemId[i] be any sequence of non-overlapping Subsegments (identified by index j) that is a conforming Subsegment sequence as defined in 4.5.4, where Subsegments are from any collection item Representations with collectionId equal to cId and collectionItemId equal to cItemId[i], and switching between these Representations may take place as allowed by @bitstreamSwitching, @startWithSAP, @subsegmentStartsWithSAP, Switching, RandomAccess, or starts_with_SAP and SAP_type in the SegmentIndexBox.

Let a concatenated Subsegment for Subsegment index m consist of the Subsegment m of the collection Representation, followed by Subsegments ss[cItemId[i]][m] for all values of i in the range of 0 to N−1, inclusive, in increasing order of i.

Figure 16:
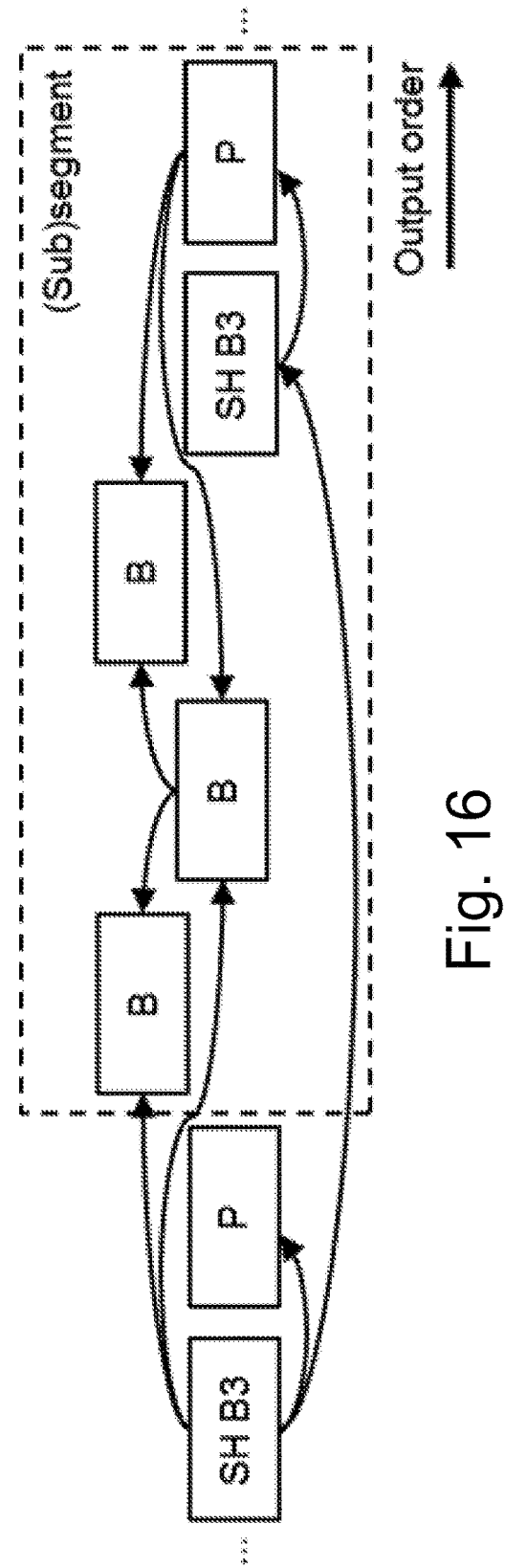
FIG. 16 shows an example of categorization of shared coded pictures according to an embodiment of the invention.

According to an embodiment, shared coded pictures of type 3 are used to form (Sub)segments as illustrated in FIG. 16. SH indicates a shared coded picture. B following SH indicates that the shared coded picture is inter-predicted and that bi-prediction may be used. The B pictures within the (Sub)segment may be predicted from the shared coded picture of the previous (Sub)segment(s) but not from any other pictures of the previous (Sub)segment(s), since the reception of the other pictures is not guaranteed (instead of respective pictures from another bitstream representing the same input picture sequence). It is asserted that the bi-prediction for the B pictures anyhow improves the compression efficiency.

Sub-pictures or MCTSs may be processed to include guard bands, e.g. by enlarging the sub-picture or tile set area prior to encoding. A guard band may be defined as an area in a packed frame that is not allocated by regions of the projected frame in region-wise packing. Guard bands may be used for example for one or more of the following reasons:

Avoiding loop filter leaks from one region to another. In-loop deblocking and/or sample adaptive offset filtering are not affected by content from a different region and is likely to result into a reasonable reconstructed signal.

Leak-free sample interpolation in rendering. Thanks to guard bands sample value interpolation for rendering the reconstructed content on a viewport or a rendering mesh is not affected by content from a different region.

Allowing viewports partly within the guard band. It may happen that the viewport requires sample locations slightly outside a region but within the guard band. When the guard band contains proper image content, it may be used in rendering. This may simplify the rendering process, since content from fewer regions is needed for rendering.

Concealment of boundaries of regions of different quality and/or resolution. When the viewport crosses the boundary between a high-quality (HQ) region and a low-quality (LQ) region, it would be subjectively beneficial to conceal the boundary. This can be achieved by encoding a guard band that expands the LQ region and where the picture quality gradually changes from LQ towards the quality of the HQ region.

According to an embodiment, a guard band is encoded in a manner that sample values in the guard bands are not used as references in inter prediction (neither through direct referencing nor through using them as input for interpolating fractional sample values). The guard band is indicated to be constrained in said manner in or along the bitstream, for example in a container file encapsulating the bitstream.

According to an embodiment, it is decoded from or along the bitstream that a guard band is constrained in a manner that sample values in the guard bands are not used as references in inter prediction (neither through direct referencing nor through using them as input for interpolating fractional sample values). Decoded content of the region(s) of the decoded pictures are extended to the guard band as a post-processing operation (subsequent to decoding) without making a separate copy of the decoded picture. Such extending may comprise e.g. re-projecting content from another region so that the image signal continues from the region to its guard band continuously. Guard bands can therefore be compressed efficiently (e.g. by copying the boundary sample to the guard bands through intra prediction) while post-processing yields improved fidelity of guard bands e.g. for rendering purposes.

Figure 17:
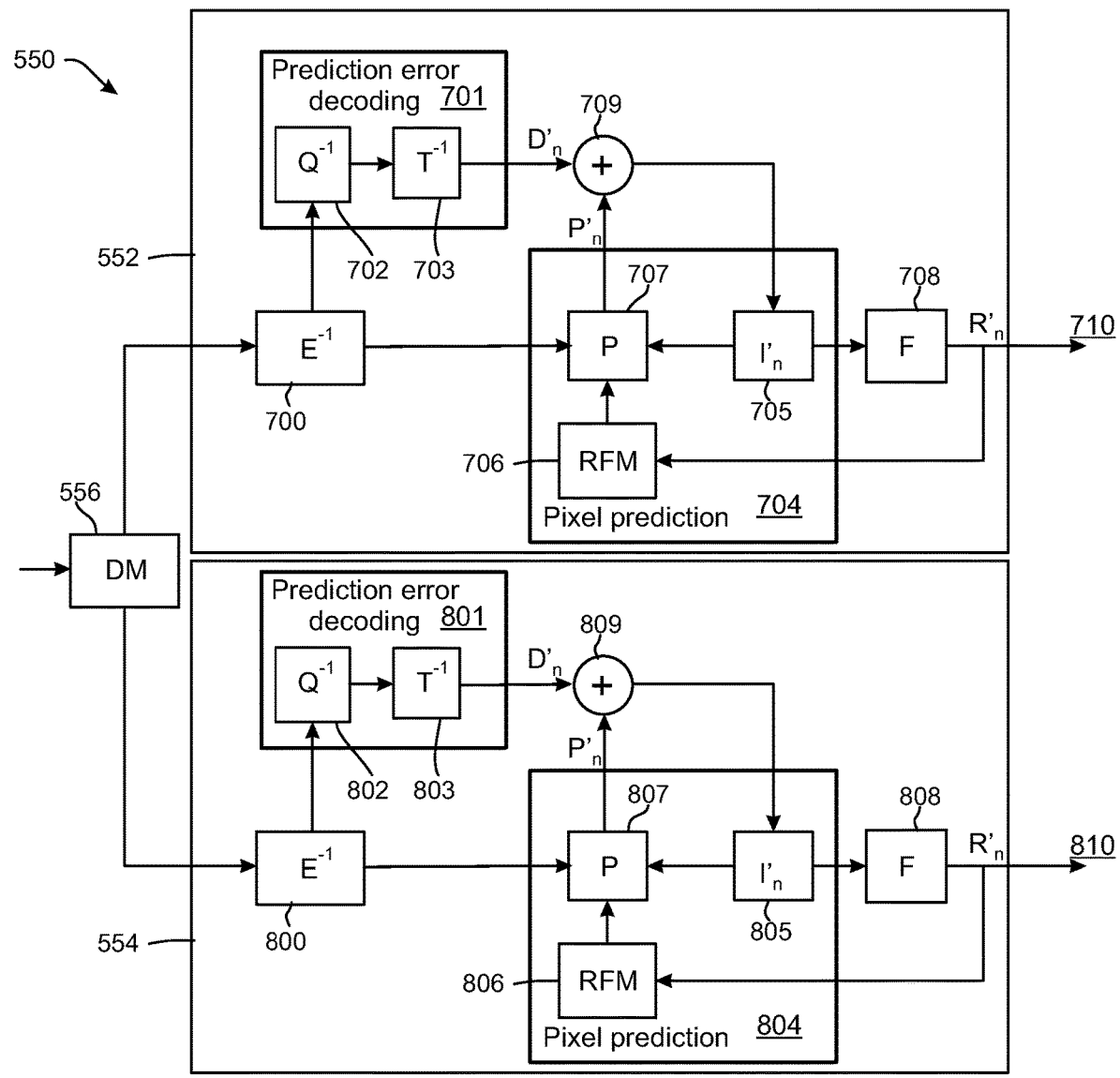
FIG. 17 shows a schematic diagram of a decoder suitable for implementing embodiments of the invention.

FIG. 17 shows a block diagram of a video decoder suitable for employing embodiments of the invention. FIG. 17 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

Figure 18:
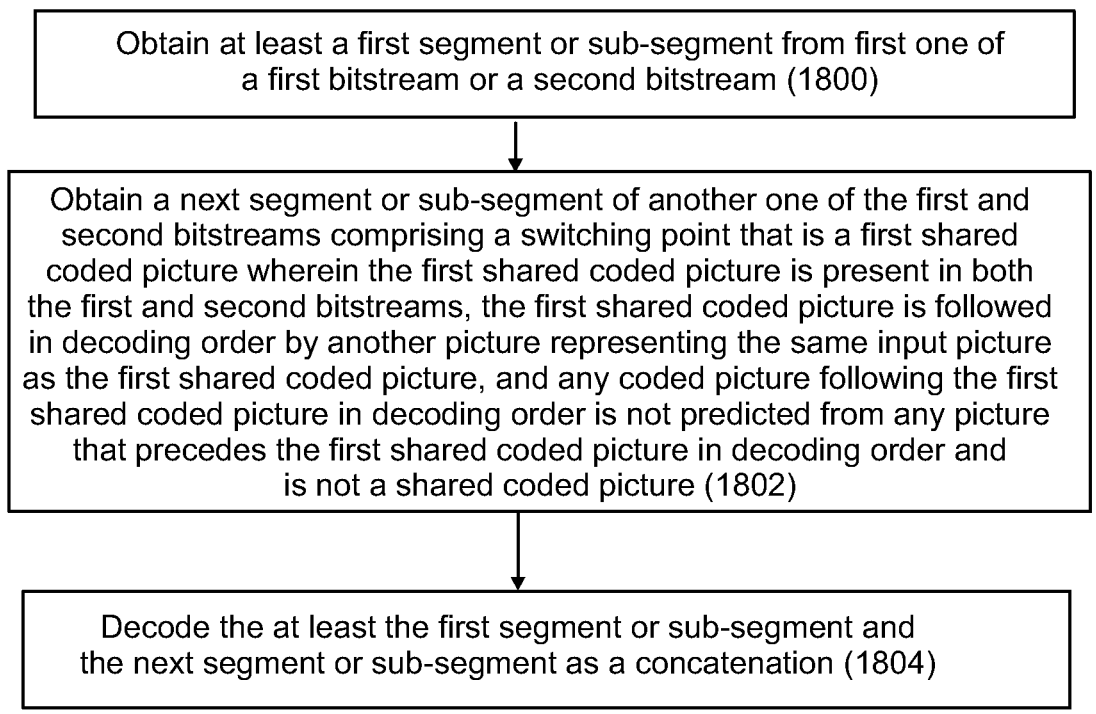
FIG. 18 shows a flow chart of a decoding method according to an embodiment of the invention.

The decoder may be arranged to operate according to the method of FIG. 18, the method comprising obtaining (1800) at least a first segment or sub-segment from first one of a first bitstream or a second bitstream; obtaining (1802) a next segment or sub-segment of another one of the first and second bitstreams comprising a switching point that is a first shared coded picture wherein the first shared coded picture is present in both the first and second bitstreams, the first shared coded picture is followed in decoding order by another picture representing the same input picture as the first shared coded picture, and any coded picture following the first shared coded picture in decoding order is not predicted from any picture that precedes the first shared coded picture in decoding order and is not a shared coded picture; and decoding (1804) the at least the first segment or sub-segment and the next segment or sub-segment as a concatenation.

The decoding operations may be carried out by with a single-layer codec, such as HEVC Main profile codec, i.e. no scalable coding extension is required. The use of shared codec pictures as described above enable similar functionality as provided in the SHVC ROI approach by the infrequent IRAP pictures in the base layer and the relatively frequent IRAP pictures in enhancement layers. This functionality can be used for achieving frequent switching capability with moderate rate-distortion penalty.

The embodiments described above enable to control the operation of the decoder so as to reduce the decoding complexity. According to an embodiment for viewport dependent delivery, MCTSs or sub-picture sequences are decoded with separate decoder instances. Visible MCTSs or sub-picture sequences are decoded at full picture rate, while other MCTSs or sub-picture sequences are decoded at reduced picture rate. For example, only the shared coded pictures may be decoded, or shared coded pictures and each picture following a shared coded picture in decoding order may be decoded.

When viewing orientation is changed, MCTSs or sub-picture sequences that become visible may be retroactively decoded. When temporally hierarchical coding is utilized, only a necessary temporal subset needs to be decoded.

Figure 19:
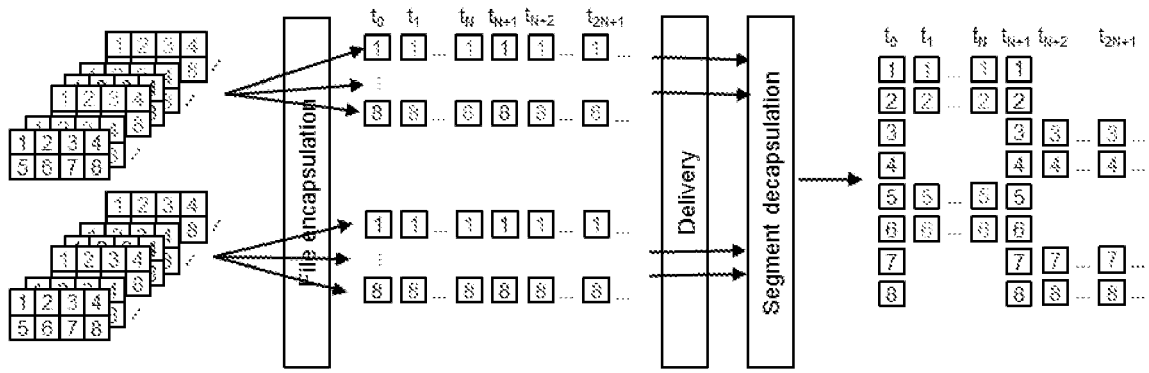
FIG. 19 shows an example of switching between bitstreams in a position of a shared coded picture according to an embodiment of the invention.

An example is illustrated in FIG. 19. Shared coded pictures are always decoded. MCTSs 1, 2, 5, and 6 cover the viewport from $t_1$ to $t_N$, and consequently only those are decoded at the full picture rate (for pictures $t_1$ to $t_N$). Viewing orientation is then changed and MCTSs 3, 4, 7, and 8 cover the viewport from $t_N+2$ onwards and only these MCTSs are hence decoded at full picture rate.

Assuming N=8, shared coded pictures increase decoding complexity by ⅛=12.5% compared to conventional approaches. However, when no viewing orientation changes and 4×2 tile grid is used, the presented decoding complexity method reduces the decoding complexity by 1−(1+8*0.5)/8=⅜=37.5% compared to conventional approaches. Even when viewing orientation changes in the middle of a GOP and retroactive accelerated decoding of some MCTSs is required, decoding complexity is likely to be reduced compared to conventional approaches.

Figure 20:
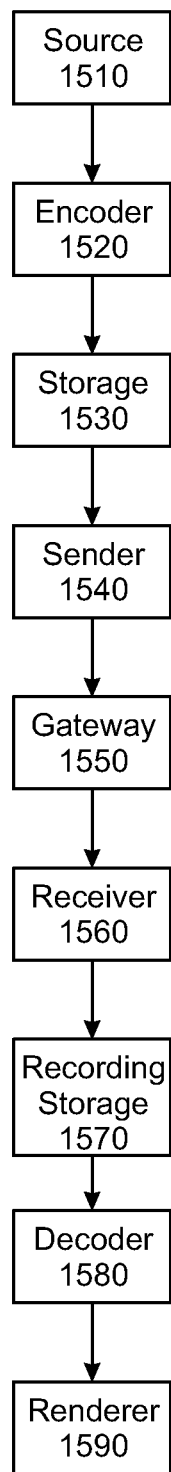
FIG. 20 shows a schematic diagram of an example multimedia communication system within which various embodiments may be implemented.

FIG. 20 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder.

In the above, some embodiments have been described with reference to segments, e.g. as defined in MPEG-DASH. It needs to be understood that embodiments may be similarly realized with subsegments, e.g. as defined in MPEG-DASH.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client. For example, some embodiments could be realized with the M3U manifest format.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
at least one processor and at least one non-transitory memory, said at least one memory stored with code thereon, which when executed by said at least one processor, causes the apparatus to perform:
encode an input picture sequence into a first bitstream, to encode the input picture sequence into the first bitstream the apparatus is further caused to:

encode a first input picture into first two coded pictures of the first bitstream, wherein one of said first two coded pictures of the first bitstream is a first shared coded picture; and encode a first set of input pictures into a first set of coded pictures of the first bitstream, following in decoding order the first two coded pictures of the first bitstream, wherein any picture subsequent to the first shared coded picture in decoding order is not predicted from any picture that precedes the first shared coded picture in decoding order and that is not a shared coded picture; and encode the input picture sequence into a second bitstream, to encode the input picture sequence into the second bitstream the apparatus is further caused to:

encode the first input picture into first two coded pictures of the second bitstream, wherein one of said first two coded pictures of the second bitstream is the first shared coded picture, and wherein the one of said first two coded pictures of the second bitstream shares an identifier value with the first shared coded picture; and encode the first set of input pictures into a second set of coded pictures of the second bitstream, following in decoding order the first two coded pictures of the second bitstream and differing from the first set of coded pictures of the first bitstream, wherein any picture subsequent to the first shared coded picture in decoding order is not predicted from any picture that precedes the first shared coded picture in decoding order and that is not a shared coded picture.

2. The apparatus according to claim 1, wherein the first shared coded picture uses as prediction only zero or more other shared coded pictures.

3. The apparatus according to claim 1, wherein the apparatus is further caused to:
indicate that switching between the first and second bitstreams is allowed starting from the first shared coded picture, said indication residing in the first and/or second bitstream, in a first segment or sub-segment formed from the first bitstream, in a second segment or sub-segment formed from the second bitstream, and/or in a media presentation description.

4. The apparatus according to claim 3, wherein to indicate that the switching between the first and second bitstreams is allowed starting from the first shared coded picture, the apparatus is further caused to:
include the identifier value for the first shared coded picture in or along both the first and second bitstream.

5. The apparatus according to claim 3, wherein the apparatus is further caused to perform:
form the first segment or sub-segment so that it starts, in decoding order, with the first shared coded picture;
form the second segment or sub-segment so that it starts, in decoding order, with the first shared coded picture; and
indicate in the media presentation description that the switching between the first and second bitstreams is allowed at start of the first or second segment or sub-segment.

6. The apparatus according to claim 3, wherein the apparatus is further caused to perform:
indicate, in the media presentation description, that the first and second bitstreams are alternatives for extraction into a collection representation.

7. A method comprising:
encoding an input picture sequence into a first bitstream, said encoding comprising:

encoding a first input picture into first two coded pictures of the first bitstream, wherein one of said first two coded pictures of the first bitstream is a first shared coded picture; and encoding a first set of input pictures into a first set of coded pictures of the first bitstream, following in decoding order the first two coded pictures of the first bitstream, wherein any picture subsequent to the first shared coded picture in decoding order is not predicted from any picture that precedes the first shared coded picture in decoding order and that is not a shared coded picture; and encoding the input picture sequence into a second bitstream, said encoding comprising:
encoding the first input picture into first two coded pictures of the second bitstream, wherein one of said first two coded pictures of the second bitstream is the first shared coded picture, and wherein the one of said first two coded pictures of the second bitstream shares an identifier value with the first shared coded picture; and encoding the first set of input pictures into a second set of coded pictures of the second bitstream, following in decoding order the first two coded pictures of the second bitstream and differing from the first set of coded pictures of the first bitstream, wherein any picture subsequent to the first shared coded picture in decoding order is not predicted from any picture that precedes the first shared coded picture in decoding order and that is not a shared coded picture.

8. The method according to claim 7, wherein the first shared coded picture uses as prediction only zero or more other shared coded pictures.

9. The method according to claim 7, further comprising:
indicating that switching between the first and second bitstreams is allowed starting from the first shared coded picture, said indication residing in the first and/or second bitstream, in a first segment or sub-segment formed from the first bitstream, in a second segment or sub-segment formed from the second bitstream, and/or in a media presentation description.

10. The method according to claim 9, wherein said indicating that the switching between the first and second bitstreams is allowed starting from the first shared coded picture comprises:
including the identifier value for the first shared coded picture in or along both the first and second bitstream.

11. The method according to claim 9, further comprising
forming the first segment or sub-segment so that it starts, in decoding order, with the first shared coded picture;
forming the second segment or sub-segment so that it starts, in decoding order, with the first shared coded picture; and
indicating in the media presentation description that the switching between the first and second bitstreams is allowed at start of the first or second segment or sub-segment.

12. The method according to claim 9, further comprising:
indicating, in the media presentation description, that the first and second bitstreams are alternatives for extraction into a collection representation.

13. An apparatus comprising
at least one processor and at least one non-transitory memory, said at least one memory stored with code thereon, which when executed by said at least one processor, causes the apparatus to perform:

obtain at least a first segment or sub-segment from first one of a first bitstream or a second bitstream;

obtain a next segment or sub-segment of another one of the first and second bitstreams comprising a switching point that is a first shared coded picture wherein:

the first shared coded picture is present in both the first and second bitstreams, wherein the first shared coded picture present in the first bitstream shares an identifier value with the first shared coded picture present in the second bitstream;

the first shared coded picture is followed in decoding order by another picture representing a same input picture as the first shared coded picture; and any coded picture following the first shared coded picture in decoding order is not predicted from any picture that precedes the first shared coded picture in decoding order and that is not a shared coded picture; and decode the at least the first segment or sub-segment and the next segment or sub-segment as a concatenation.

14. The apparatus according to claim 13, wherein to obtain, the apparatus is further caused to request said segments or sub-segments from a server and receiving said segments or sub-segments.

15. The apparatus according to claim 14, wherein the apparatus is further caused to:

parse a first indication that switching between a first bitstream and a second bitstream is allowed, said first indication residing in the first and/or second bitstream, in a first segment or sub-segment formed from the first bitstream, in a second segment or sub-segment formed from the second bitstream, and/or in a media presentation description;

determine to switch from the first one of the first and second bitstreams to the another one of the first and second bitstreams; and determine on the basis of the first indication or a second indication the next segment or sub-segment of the another one of the first and second bitstreams that comprises a switching point.

16. The apparatus according to claim 15, wherein said first indication comprises the identifier value for the first shared coded picture in or along both the first and second bitstream.

17. The apparatus according to claim 15, wherein the apparatus is further caused to:

decode, from the media presentation description, that the switching between the first and second bitstreams is allowed at start of the next segment or sub-segment.

18. The apparatus according to claim 15, wherein the apparatus is further caused to:

decode, from the media presentation description, that the first and second bitstreams are alternatives for extraction into a collection representation; and request, receive, resolve, and/or decode the collection representation.

19. A method comprising:

obtaining at least a first segment or sub-segment from first one of a first bitstream or a second bitstream;

obtaining a next segment or sub-segment of another one of the first and second bitstreams comprising a switching point that is a first shared coded picture wherein the first shared coded picture is present in both the first and second bitstreams, wherein the first shared coded picture present in the first bitstream shares an identifier value with the first shared coded picture present in the second bitstream, the first shared coded picture is followed in decoding order by another picture representing a same input picture as the first shared coded picture, and any coded picture following the first shared coded picture in decoding order is not predicted from any picture that precedes the first shared coded picture in decoding order and that is not a shared coded picture; and decoding the at least the first segment or sub-segment and the next segment or sub-segment as a concatenation.

20. A method according to claim 19, wherein said obtaining comprises requesting said segments or sub-segments from a server and receiving said segments or sub-segments.

21. The method of claim 1, wherein the one of said first two coded pictures of the second bitstream and the first shared coded picture are substantially identical.

22. The method of claim 1, wherein the first bitstream and the second bitstream comprise a single stream of decodable pictures.

* * * * *